(12) United States Patent
Lipton

(10) Patent No.: US 12,181,025 B2
(45) Date of Patent: Dec. 31, 2024

(54) PERFECT PLANE MECHANISM

(71) Applicant: University of Washington, Seattle, WA (US)

(72) Inventor: Jeffrey Lipton, Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 18/557,643

(22) PCT Filed: Apr. 28, 2022

(86) PCT No.: PCT/US2022/026709
§ 371 (c)(1),
(2) Date: Oct. 27, 2023

(87) PCT Pub. No.: WO2022/232378
PCT Pub. Date: Nov. 3, 2022

(65) Prior Publication Data
US 2024/0209925 A1 Jun. 27, 2024

Related U.S. Application Data

(60) Provisional application No. 63/180,815, filed on Apr. 28, 2021.

(51) Int. Cl.
*F16H 21/04* (2006.01)
(52) U.S. Cl.
CPC .................... *F16H 21/04* (2013.01)
(58) Field of Classification Search
CPC ................ B25J 18/007; F16H 21/04
(Continued)

(56) References Cited

U.S. PATENT DOCUMENTS

| 1,190,215 | A | * | 7/1916 | Becker | ................... F16H 21/04 74/521 |
| 3,840,206 | A | * | 10/1974 | Palmer | ............... B23K 37/0461 248/424 |

(Continued)

OTHER PUBLICATIONS

International Search Report for corresponding PCT application No. PCT/US2022/026709, dated Jul. 27, 2022.

(Continued)

*Primary Examiner* — T. Scott Fix
(74) *Attorney, Agent, or Firm* — McDonnell Boehnen Hulbert & Berghoff LLP

(57) ABSTRACT

The present disclosure provides a mechanical linkage device including a ground link comprising an inverse center linked to one end of the ground link. The mechanical linkage device further includes a movement link connecting the ground link to a control point. The mechanical linkage device further includes two or more linkages having a first link of the two or more linkages including a first end linked to the control point and a second link of the two or more linkages including second end linked to an end point. The end point, the control point, and the inverse center of the ground link remain co-linear. The control point and the end point have an inverse relationship such that movement of the control point is inversely translated to the end point. The ground link, the movement link, and at least one of the two or more linkages do not all lie in a plane throughout an entire range of motion of the mechanical linkage device.

20 Claims, 49 Drawing Sheets

(58) Field of Classification Search
USPC .................................................. 74/479.01
See application file for complete search history.

(56) References Cited

U.S. PATENT DOCUMENTS

| | | |
|---|---|---|
| 5,816,105 A | 10/1998 | Adelstein |
| 8,109,171 B2 | 2/2012 | Nakao |
| 2005/0222830 A1 | 10/2005 | Massie |
| 2007/0173975 A1 | 7/2007 | Schena |
| 2009/0158674 A1* | 6/2009 | Guerrero ............... E21B 43/105 74/89 |
| 2015/0321338 A1 | 11/2015 | Parks |
| 2016/0363202 A1 | 12/2016 | Van de Ven |
| 2021/0362321 A1 | 11/2021 | Olsson |

OTHER PUBLICATIONS https://www.brighthubengineering.com/machine-design/12903-exact-straight-line-mechanisms/, retrieved Oct. 26, 2023.

* cited by examiner

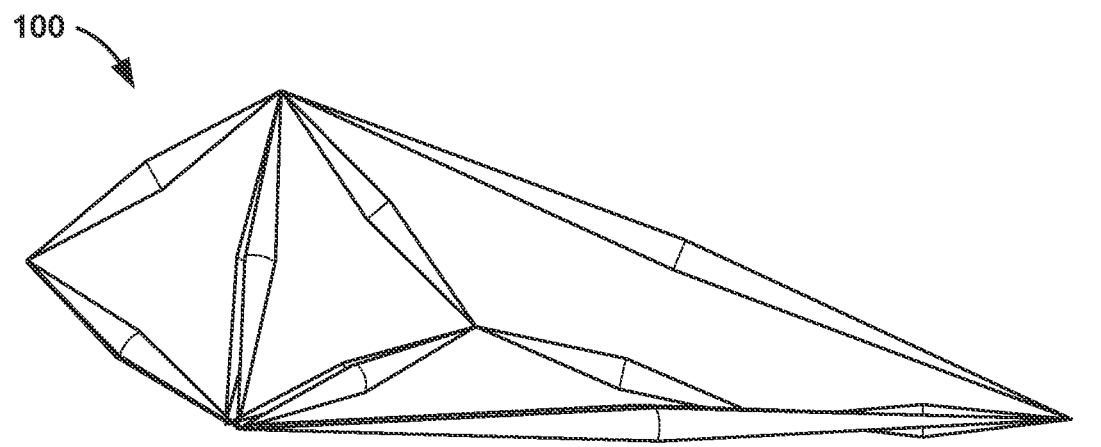
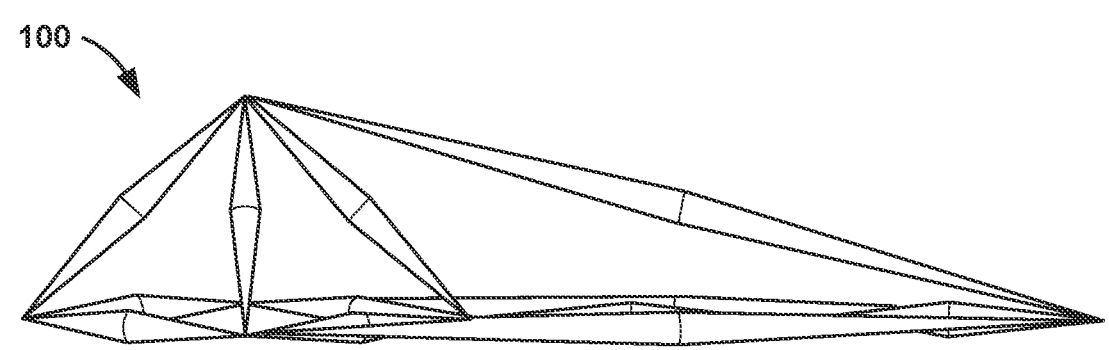
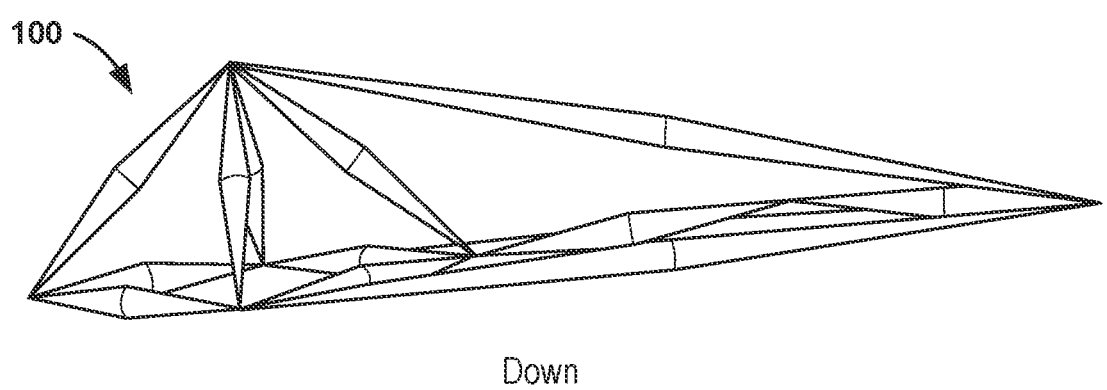
FIG. 6

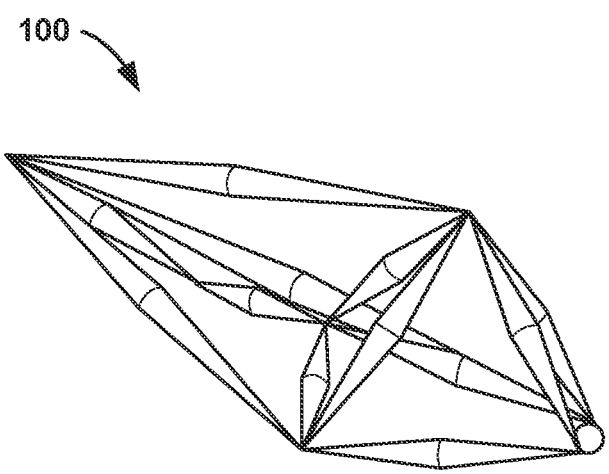
Middle Left
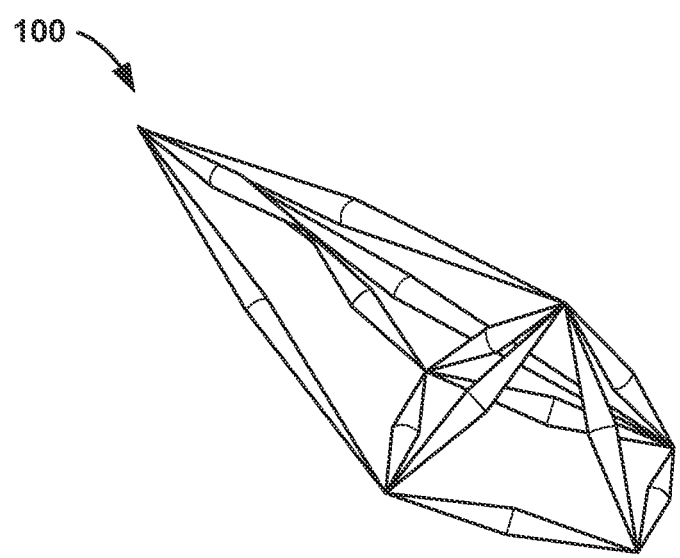
Down Left
FIG. 7

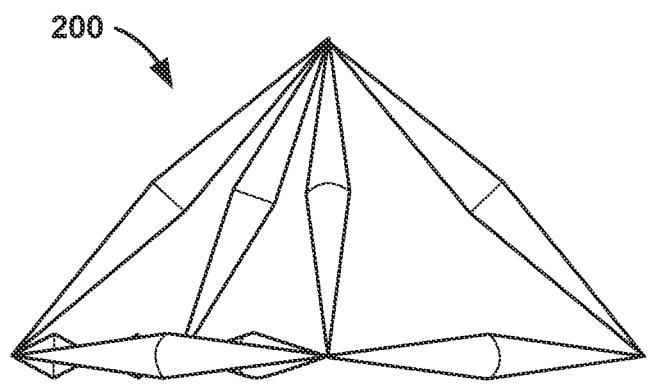
Neutral
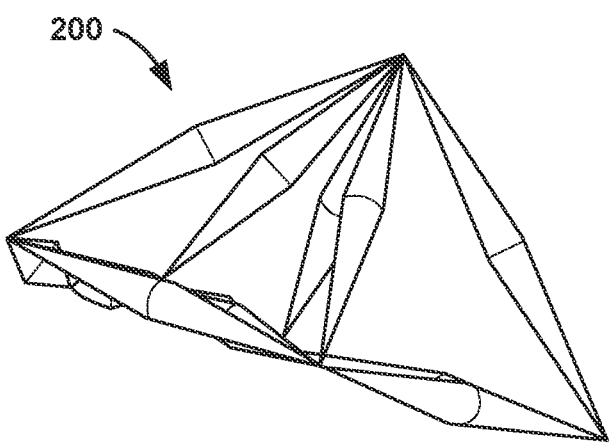
Down
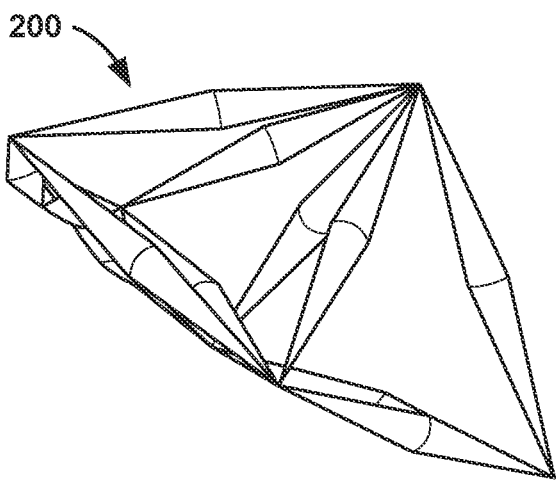
Down More
FIG. 10

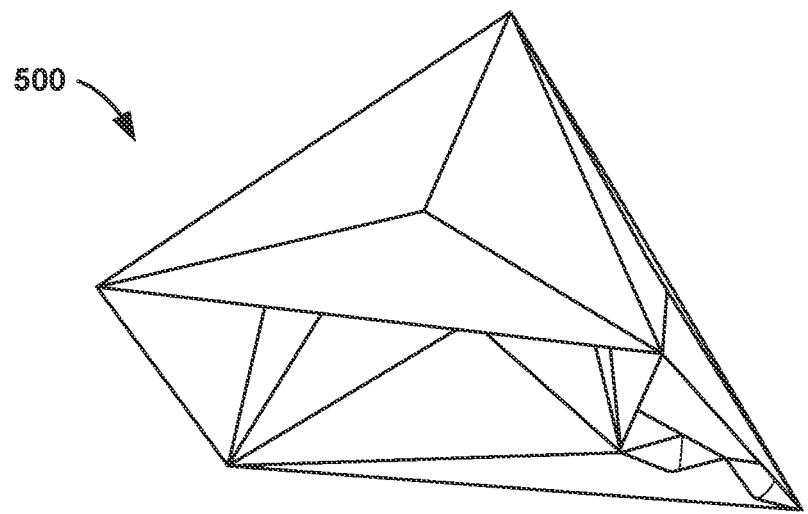
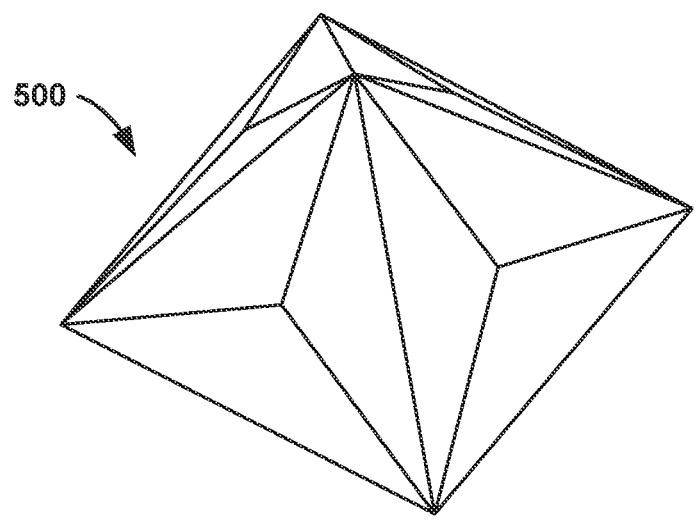
FIG. 18

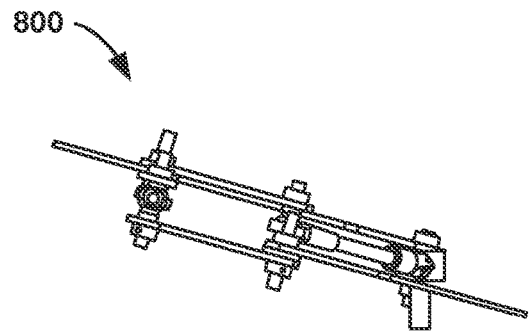
Up Left
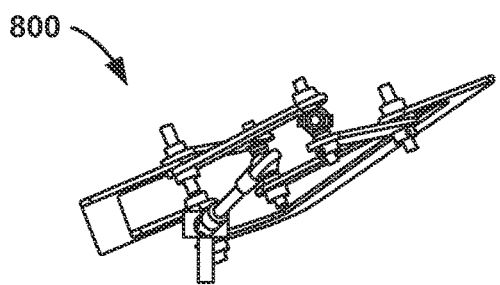
Up Right
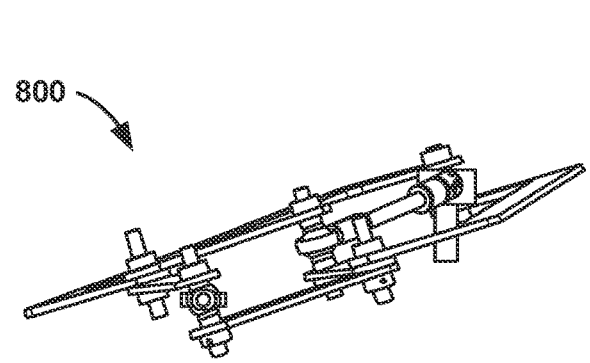
Down Left
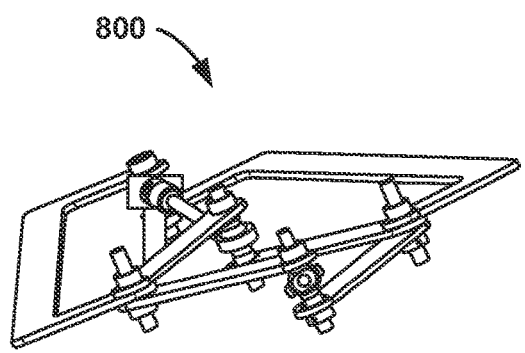
Down Right
FIG. 30

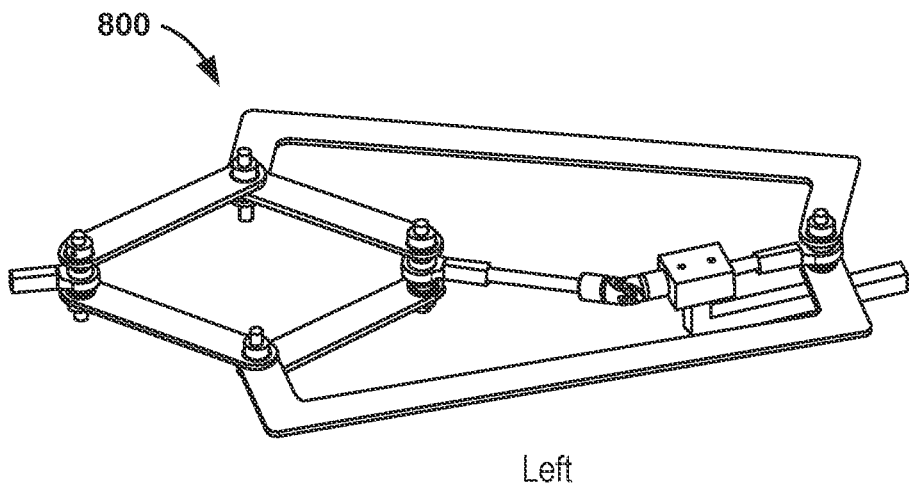
Left
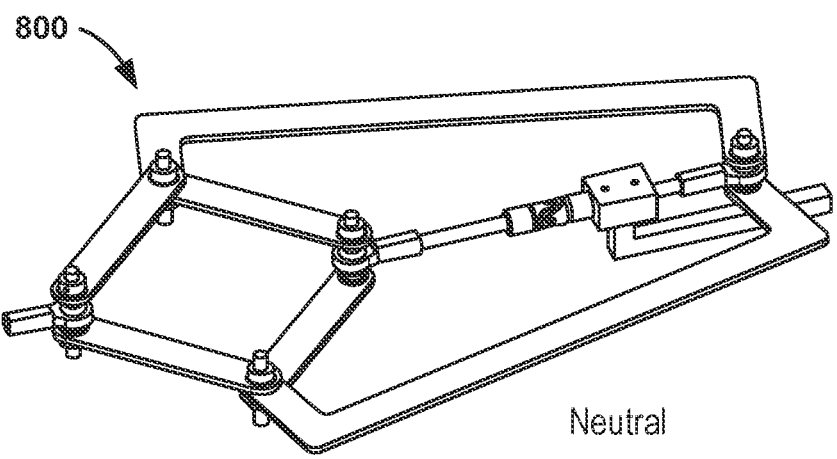
Neutral
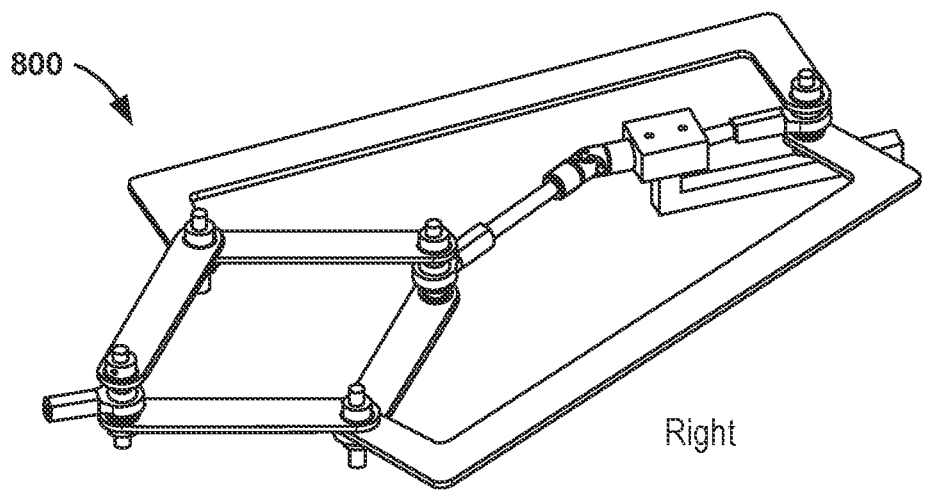
Right
FIG. 31

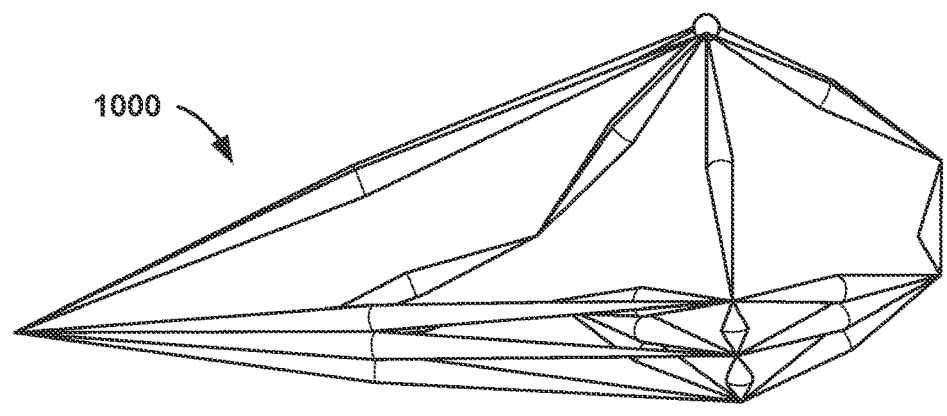
Up
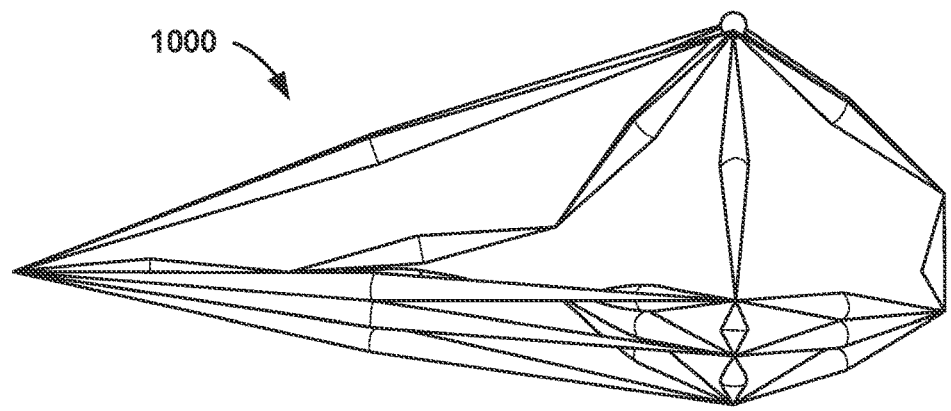
Neutral
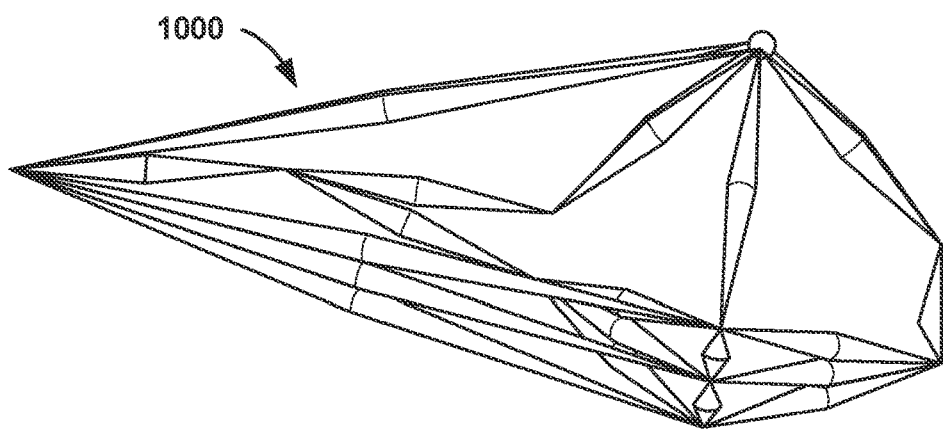
Down
FIG. 38

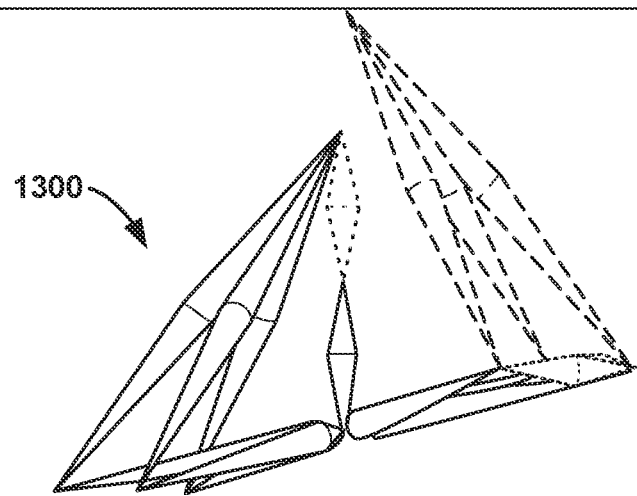
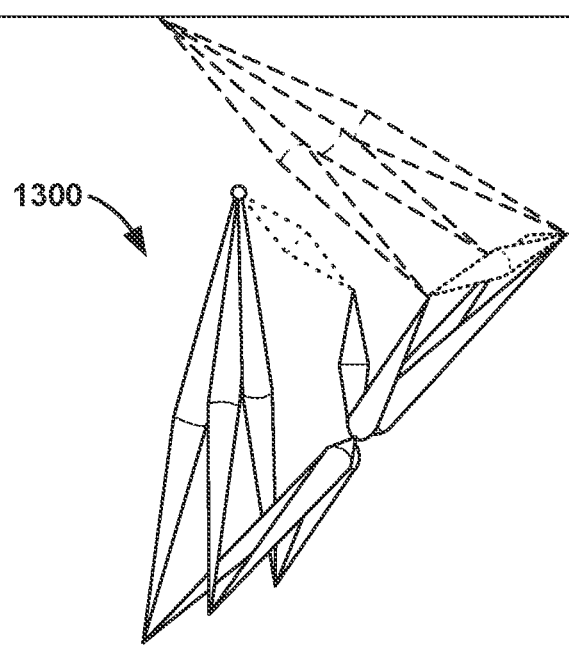
FIG. 48

PERFECT PLANE MECHANISM

CROSS-REFERENCE TO RELATED APPLICATIONS

This application is a U.S. National Phase application of, and claims the benefit of, International (PCT) Application No. PCT/US2022/026709, filed Apr. 28, 2022, which claims priority to U.S. Provisional Application No. 63/142,580 filed Jan. 28, 2021, the contents of both of which are hereby incorporated by reference in their entirety.

BACKGROUND

Unless otherwise indicated herein, the materials described in this section are not prior art to the claims in this application and are not admitted to be prior art by inclusion in this section.

Precise movement of mechanical linkages are essential to a variety of applications in a number of technical fields. However, existing mechanical linkages that are able to deliver high level of precision of movement are typically reserved for expensive high-end machines. Therefore, an improved low-cost mechanical linkage allowing for precise movements may be desirable.

SUMMARY

The present disclosure provides a mechanical linkage allowing movement in a perfect plane, or large diameter sphere, of one end of the mechanism relative to the other. In particular, the present disclosure provides a mechanical linkage that constrains the movement of a point to the plane referencing only a ground link. The mechanical linkages described herein are the physical manifestation of the idea that a normal can define a plane. The mechanical linkages described herein can be used to move a point in a plane, on a large diameter sphere, or on a line or circle. Combining these mechanical linkages makes a movement device that can constrain a body to a plane and uses no shafts for parallel movement. Such a construction brings a level of precision reserved for high-end machines costing hundreds of thousands down to the tens of dollars level. The mechanical linkages described herein have applications in automotive suspensions, micro-electromechanical systems (MEMS) devices, measurement tools, Machining tools, 3D printers and more.

In particular, in one aspect, a mechanical linkage device is provided including a ground link comprising an inverse center linked to one end of the ground link. The mechanical linkage device further includes a movement link connecting the ground link to a control point. The mechanical linkage device further includes two or more linkages having a first link of the two or more linkages including a first end linked to the control point and a second link of the two or more linkages including second end linked to an end point. The end point, the control point, and the inverse center of the ground link remain co-linear. The control point and the end point have an inverse relationship such that movement of the control point is inversely translated to the end point. The ground link, the movement link, and at least one of the two or more linkages do not all lie in a plane throughout an entire range of motion of the mechanical linkage device.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 6 illustrates various views of the mechanical linkage device of FIG. 1 with different displacements, according to an example embodiment.

FIG. 7 illustrates various views of the mechanical linkage device of FIG. 1 with different displacements, according to an example embodiment.

FIG. 10 illustrates various views of the mechanical linkage device of FIG. 8 with different displacements, according to an example embodiment.

FIG. 18 illustrates various views of the mechanical linkage device of FIG. 16, according to an example embodiment.

FIG. 30 illustrates various views of the example mechanical linkage device of FIG. 28, according to an example embodiment.

FIG. 31 illustrates various views of the example mechanical linkage device of FIG. 28, according to an example embodiment.

FIG. 38 illustrates various views of the example mechanical linkage device of FIG. 35, according to an example embodiment.

FIG. 48 illustrates various views of the example mechanical linkage device of FIG. 47, according to an example embodiment.

DETAILED DESCRIPTION

Figure 1:
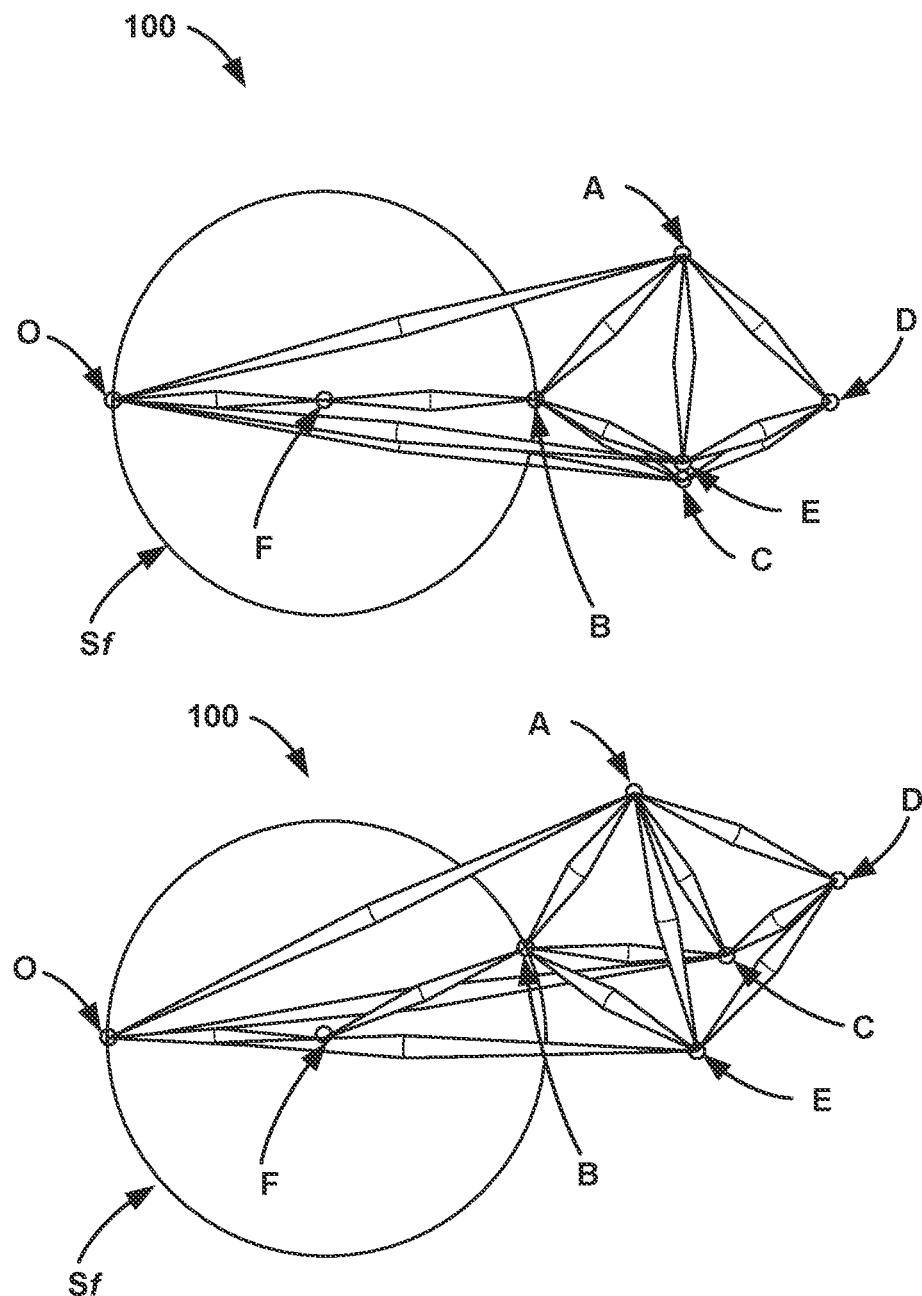
FIG. 1 illustrates an example mechanical linkage device, according to an example embodiment.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the Figures, can be arranged, substituted, combined, separated, and designed in a wide variety of different configurations, all of which are explicitly contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

As used herein, "coupled" means associated directly as well as indirectly. For example, a member A may be directly associated with a member B, or may be indirectly associated therewith, e.g., via another member C. It will be understood that not all relationships among the various disclosed elements are necessarily represented.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one embodiment" or "one example" means that one or more feature, structure, or characteristic described in connection with the example is included in at least one implementation. The phrases "one embodiment" or "one example" in various places in the specification may or may not be referring to the same example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

As used herein, with respect to measurements, "about" means +/−5%.

As used herein, with respect to measurements, "substantially" means +/−5%.

Generally, the present disclosure provides a mechanical linkage device allowing movement in a perfect plane, or large diameter sphere, of one end of the mechanism relative to the other. In particular, the present disclosure provides a mechanical linkage device that constrains the movement of a point to the plane referencing only a ground link. The mechanical linkage devices described herein are the physical manifestation of the idea that a normal can define a plane.

Thus, according to an embodiment, the present disclosure provides a mechanical linkage device including a ground link comprising an inverse center linked to one end of the ground link. The mechanical linkage device also includes a movement link connecting the ground link to a control point. The mechanical linkage device further includes two or more linkages having a first link of the two or more linkages including a first end linked to the control point and a second link of the two or more linkages including second end linked to an end point. The end point, the control point, and the inverse center of the ground link remain co-linear. The control point and the end point have an inverse relationship such that movement of the control point is inversely translated to the end point. The ground link, the movement link, and at least one of the two or more linkages do not all lie in a plane throughout an entire range of motion of the mechanical linkage device.

In an embodiment, movement of the control point on a spheroid generates a plane or a spheroid defined by the end point such that the end point is an inversion of the spheroid defined by the control point.

In an embodiment, the distance between the one end of the ground link and the other end of the ground link is the same as the distance between the other end of the ground link and the control point, constraining the end point to move in a plane normal to the ground link.

In an embodiment, the control point is constrained to a circular planar area.

In an embodiment, the constraint is enforced by a joint between the ground link and the control point with an adjustable angle to change the plane of movement.

In an embodiment, a living hinge provides constraint enforced in a joint between the ground link and the control point.

In an embodiment, a rotary joint provides constraint enforced in a joint between the ground link and the control point.

In an embodiment, the constraint is enforced by a joint at the control point and the far end of the ground link opposite the end of the ground link with the inverse center.

In an embodiment, distances and angles one or more of the ground link, the movement link, and the two or more linkages are controlled by one or more actuators to control a position of the control point.

In an embodiment, the actuation is provided through linkages to multiple actuators acting on a link connecting the ground link to the control point.

In an embodiment, an end effector is placed at the end point for sensing or acting on the environment.

In an embodiment, the end point and the control point are on the same side of the ground link.

In an embodiment, the end point and the control point are on opposite sides of the ground link.

In an embodiment, one or more of the ground link, the movement link, and the two or more linkages have spherical joint connections to each other.

In an embodiment, one or more of the spherical joint connections are compound joints emulating spherical joints.

In an embodiment, one or more of the spherical joint connections are ball joints.

In an embodiment, a spherical joint connection is positioned at a first ground link at the inverse center, at a second end of the ground link, and at a first end of the control link at the control point.

In an embodiment, one or more of the ground link, the movement link, and the two or more linkages have living hinge joint connections to each other.

In an embodiment, the device is composed of links that are connected with spherical joints and rotary joints, and one assembly of joints positioned between the control point and the end point form a compound joint that emulate the function of multiple spherical joints and links.

In an embodiment, one or more links that are substantially in a plane are connected by rotary pin joints, and wherein one or more links that are not in the plane are connected by spherical joints.

In an embodiment, the present disclosure provides a mechanical linkage device for constraining the movement of a rigid body into a plane comprising three or more mechanical linkage devices of any one of the previous embodiments with connected ground links connected to the rigid body.

In an embodiment, additional constraints between the ground link and the rigid body constrain the rigid body to move by translation and without rotation.

In an embodiment, additional linkages between the ground link and the control points force a line on the surface of a sphere described by the movements of the control points to undergo parallel transport on the sphere.

In an embodiment, the rigid body contains a line segment normal to the plane by construction.

In an embodiment, the mechanical linkage devices of the first embodiment are controlled by actuators to control the position of the rigid body.

In an embodiment, the rigid body is an end effector for sensing or acting on the environment.

In an embodiment, actuators and linkages connect to the rigid body to move the rigid body.

In an embodiment, the mechanical linkage further includes at least one triangular plate connected by rotary hinges coupled to the three or more devices.

In an embodiment, the three or more devices are connected by secondary links of different sizes.

In an embodiment, the three or more devices are connected by secondary links of the same size.

With reference to FIG. 1, the proof of perfect plane operation comes from three steps. First, the co-linearity of OBD is proven. Next, it is shown that the length of OB times the length of OD is equal to a constant. Then, it is show that the B moves along a sphere that intersects O causing the inversion of the sphere into a plane (making O the inverse center).

1) The points A, E, and C are on the surface of a sphere $S_O$ centered on the point O) and of radius $l_{OE}$. The physical manifestation of this are the links of equal length that connect A, E and C to the point O. The points A, E, and C also for a plane $P_{AEC}$ that intersects the sphere $S_O$ so the points A, E, and C are on a circle on the plane $P_{AEC}$. We construct the points B and D on opposite sides of the plane $P_{AEC}$ by having links of the same length connect the point B and D to the points A, E and C so that $l_{BA}=l_{DA}$, $l_{BC}=l_{DC}$ and $l_{BE}=l_{DE}$. B and D are therefore mirrors of each other through the plane $P_{AEC}$ so the line BD must be normal to the plane $P_{AEC}$, and intersect the plane at a point G, and B and D projected onto the plane $P_{AEC}$ are the point G. If $l_{BA}=l_{BE}=l_{BC}$ then the point G must be the center of the circle containing A, E and C in the plane $P_{AEC}$ so we set the lengths of be equal. The line OD pass through the plane P. Because O is equidistant to A, E and C the projection of O onto $P_{AEC}$ must be the point G. Since O, B, and D all project onto $P_{AEC}$ is the point G O, B and D must be co-linear.

2) G is the intersection of the line BD and the plane $P_{AEC}$ so $l_{BG}=l_{GD}$. In the plane defined by the points O, E and D, we have several lines, OB, OE, BG, DG, BE, DE, and EG and several right triangles $T_{OEG}$, $T_{BEG}$, $T_{GED}$. Let the distance $l_{OB}=y$, $l_{EG}=h$, and $l_{BG}=x$. $l_{OD}=(y+2x)$ so: $l_{OB}*l_{OD}=y^2+2xy$. $l^2_{OE}=(y+x)^2+h^2=y^2+2xy+x^2+h^2$ by the Pythagorean Theorem. $l^2_{ED}=x^2+h^2$ by the Pythagorean Theorem. Therefore $l^2_{OE}-l^2_{ED}=y^2+2xy=l_{OB}*l_{OD}=k^2$. Since $l_{OE}$ and $l_{ED}$ are fixed constants, $l_{OB}*l_{OD}$ is a constant $k^2$. Therefor D is the inverse of B through the point O.

3) By the properties of inverse geometry, if B is bound to a sphere that contains O, then the sphere will invert into a plane. The sphere $S_f$ is constructed by making two links of the same length $l_{FB}$ that connect the points O and B to F. By holding the link OF fixed, we constrain B to move on a sphere which contains O and therefore the end point D must move along a plane.

Although the proof described above references the mechanical linkage system 100 of FIGS. 1-7, a similar proof can be performed for any of the mechanical linkage systems described herein based on their particular structural arrangement. Further, Step 3 of the proof is true for any of the mechanical linkage systems described herein that have two co-linear points that have an inverse relationship.

As described above, the present disclosure provides a mechanical linkage device including a ground link comprising an inverse center linked to one end of the ground link. The mechanical linkage device further includes a movement link connecting the ground link to a control point. The mechanical linkage device further includes two or more linkages having a first link of the two or more linkages including a first end linked to the control point and a second link of the two or more linkages including second end linked to an end point. The end point, the control point, and the inverse center of the ground link remain co-linear. The control point and the end point have an inverse relationship such that movement of the control point is inversely translated to the end point. The ground link, the movement link, and at least one of the two or more linkages do not all lie in a plane throughout an entire range of motion of the mechanical linkage device. As such, the mechanical linkage devices described herein comprise a non-planar set of linkages.

Figure 2:
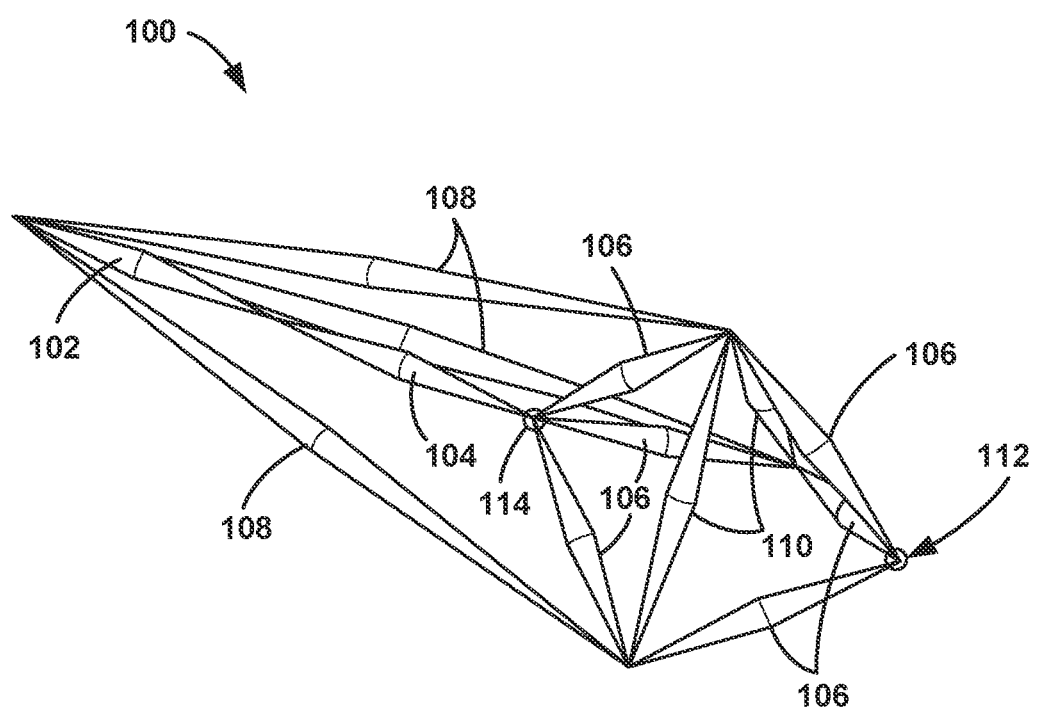
FIG. 2 illustrates another view of the mechanical linkage device of FIG. 1, according to an example embodiment.
Figure 3:
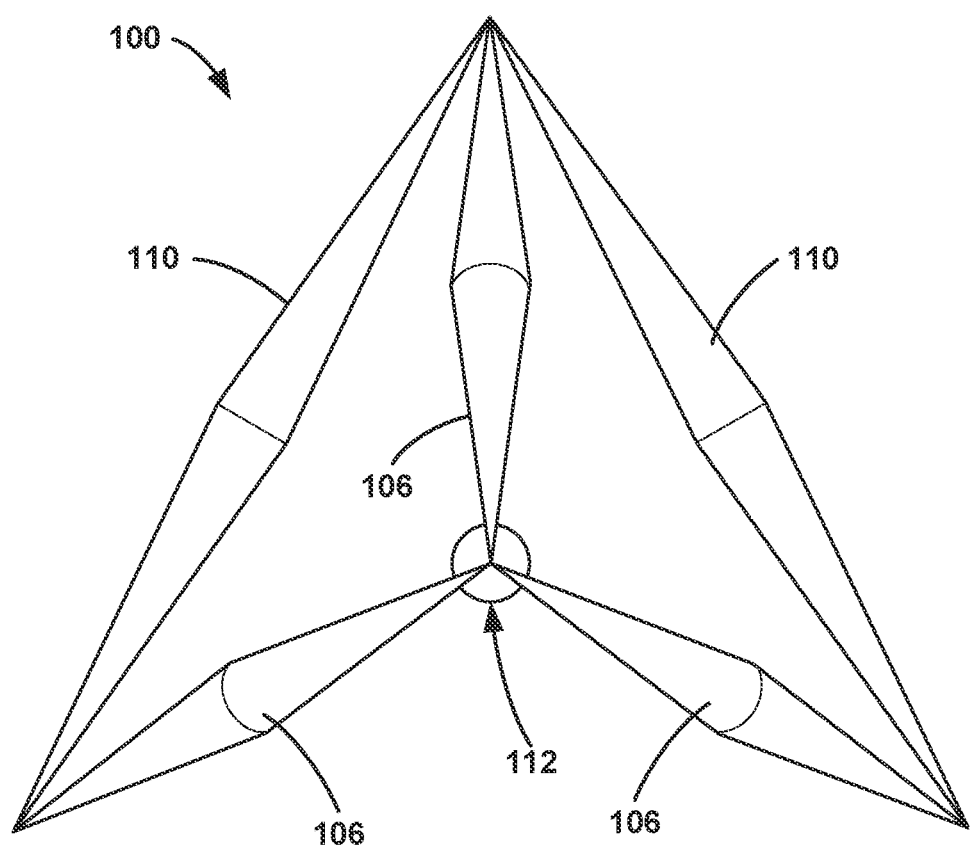
FIG. 3 illustrates another view of the mechanical linkage device of FIG. 1, according to an example embodiment.
Figure 4:
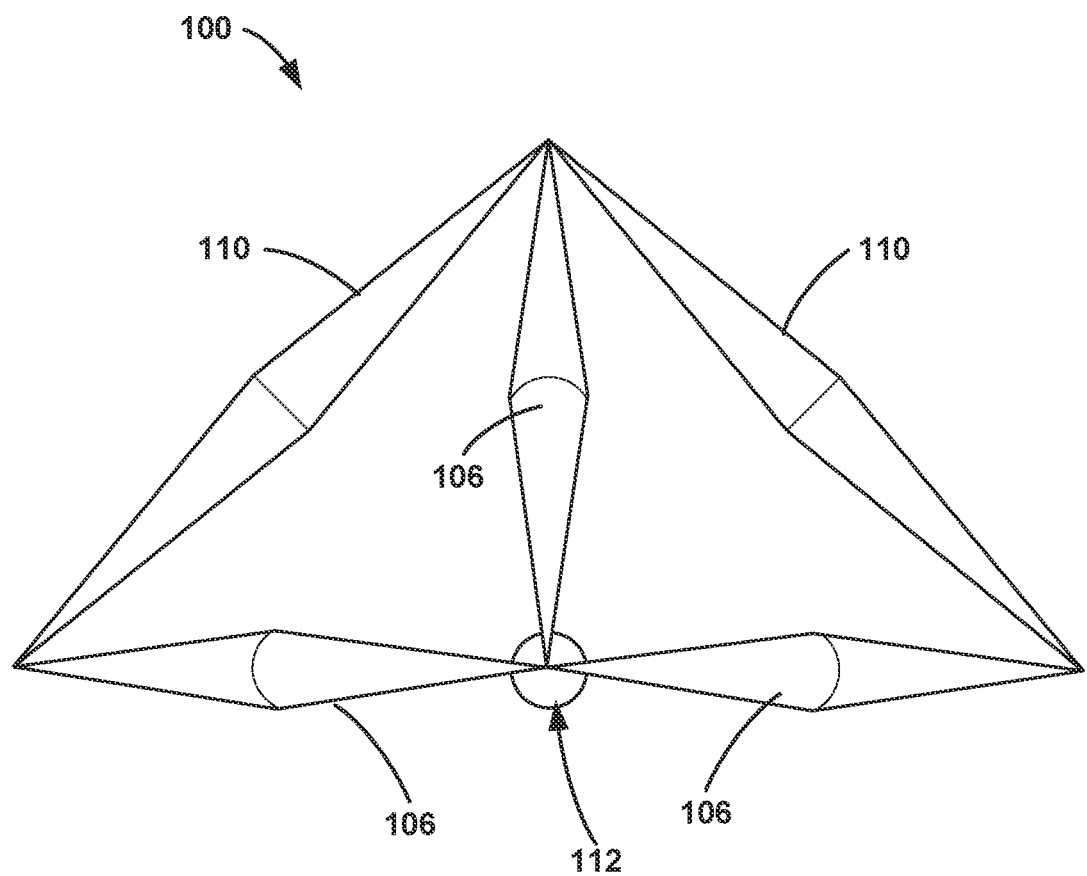
FIG. 4 illustrates another view of the mechanical linkage device of FIG. 1, according to an example embodiment.
Figure 5:
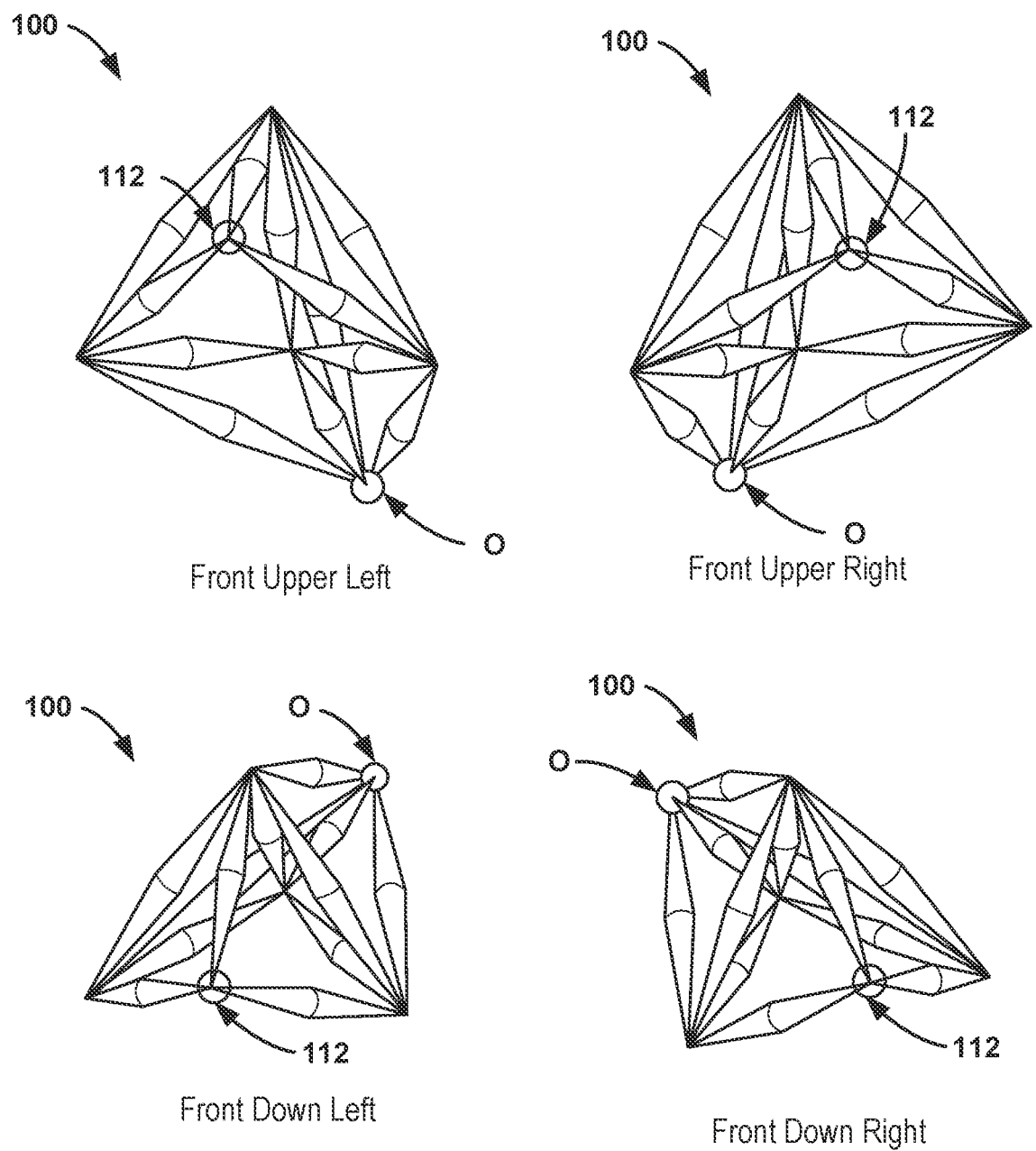
FIG. 5 illustrates various views of the mechanical linkage device of FIG. 1 with different displacements, according to an example embodiment.

There are many different ways to physically construct the mechanical linkage device described above. We see an example mechanical linkage device 100 with the points A, B, C, D, E, F, and O labeled in FIG. 1. Since the sphere Sf must be constructed and a link must be grounded we call the link connecting O to F the ground link 102 and the link connecting F and B the control link 104. Point O is the inverse center of the ground link 102, point B is the control point, and point D is the end point. The ground link 102 is a free design parameter and can be set to a designer's requirement. In one example, as shown in FIG. 1, the lengths lBA, lBC, lBE, lDA, lDC, lDE may be the same, these are all labeled link 106. In one such example, as shown in FIG. 1, the links 106 are the same length, but the size of the length of the link 106 is a free design parameter. In another example, pairs of the links 106 that are coplanar have the same length, while different pairs of the links 106 may have different lengths. In one example, as shown in FIG. 1, the lengths lOA, lOC, lOE may be the same, these are labeled link 108 and the length is defined once the length of the control link 104 and link 106 are set. In another example, the lengths of link 108 may be different, and may be defined once the length of the control link 104 and the length of their corresponding pair of links 106 are set. While the lengths lAE and lAC are not set, it may be necessary to connect them. These are free parameters which can be set independently. In one example, these links can be set to the same value such that the links that connect A to E and A to C are labeled link 110. FIG. 2 illustrates each of the links discussed above, further labels the point D that moves along the plane as end point 112 and point B as the control point 114. In FIG. 3, the mechanical linkage device 100 is illustrates in a neutral state where the control link 104 and the ground link 102 are co-linear. The link 110 is set to make the distances lAE, lEC and lAC to be the same. FIG. 4 illustrates the same orientation of the mechanical linkage device 100 but the points B, D, E, and C are in the same plane. FIG. 5 illustrates the mechanical linkage device 100 from the plane of movement with four different movements of the mechanical linkage device 100.

The mechanical linkage device 100 illustrated in FIGS. 1-7 shows one embodiment of a mechanical linkage device where all of the links form point contacts with spherical movement. The links are shown as two cones connected together at their bases. There depiction is arbitrary, as the links themselves can take any path between the joints. In this configuration of the mechanical linkage device 100, the points B, D, A, E, and C are all on the same side of the sphere Sf defined by the ground link 102 and the control link 104.

FIG. 6 illustrates a side view of the mechanical linkage device 100 where link 110 is set so the points ECBD are in the same plane when in the neutral position. The mechanical linkage device 100 moves upwards and downwards while maintaining the end point 112 in the movement plane. FIG. 7 illustrates two movements of the mechanical linkage device 100, movements near the middle of the range and to the left, and downwards and to the left.

Figure 8:
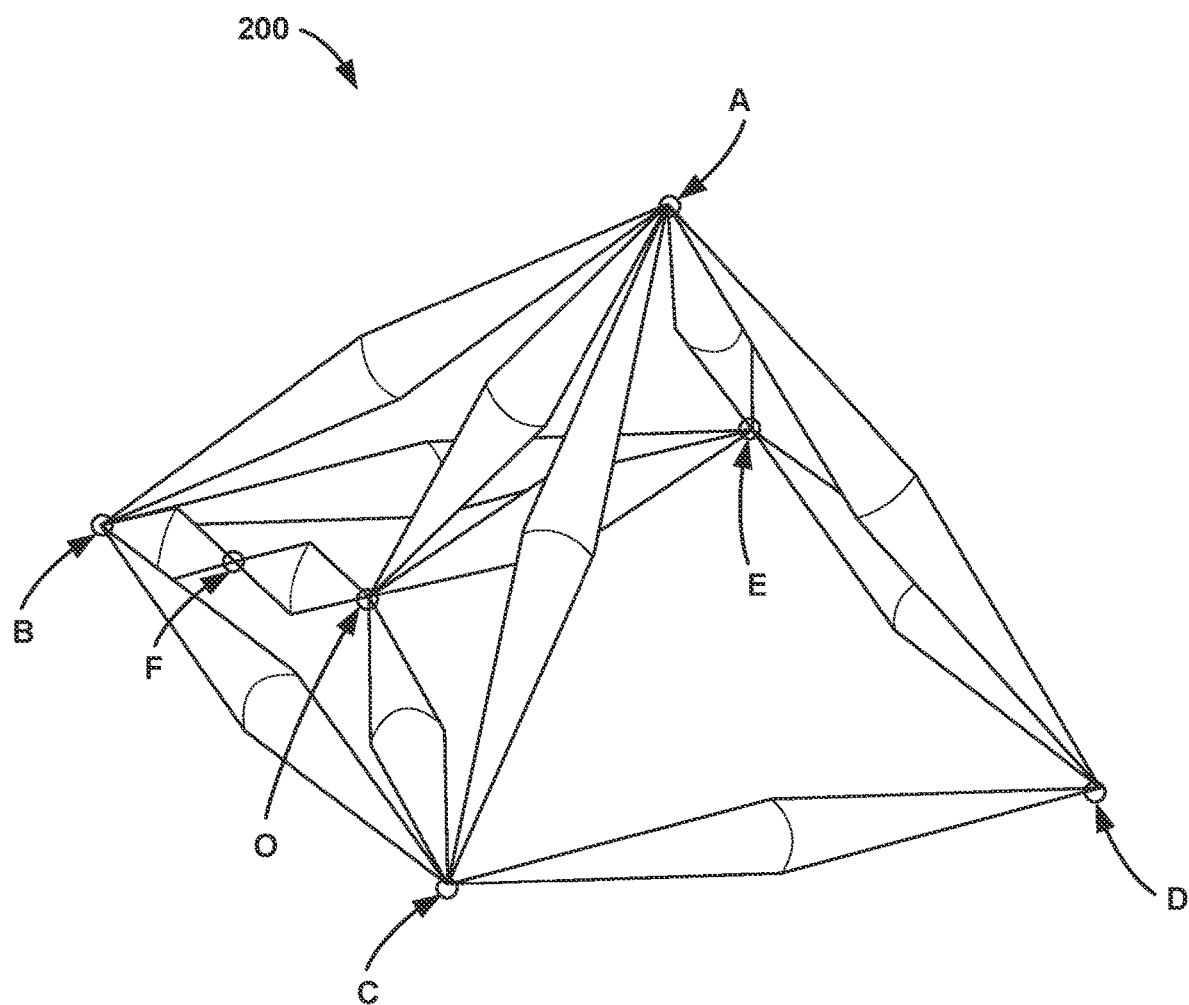
FIG. 8 illustrates another example mechanical linkage device, according to an example embodiment.
Figure 9:
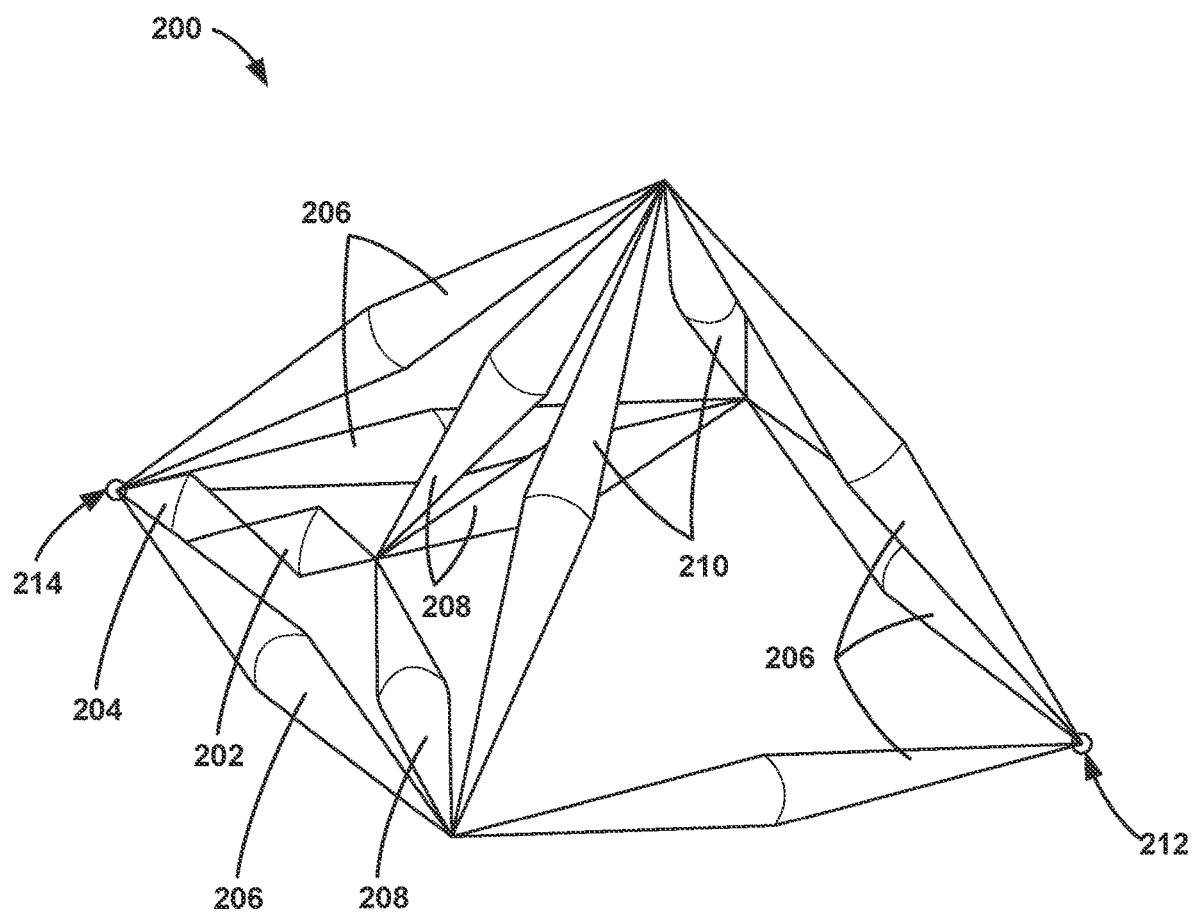
FIG. 9 illustrates another view of the mechanical linkage device of FIG. 8, according to an example embodiment.

FIG. 8 illustrates another embodiment of a mechanical linkage device 200. In particular, in FIG. 8 we see an alternative construction where the point B and D are on opposite sides of the sphere centered on F (Sf). In FIG. 9, the mechanical linkage device 200 is labeled with the same convention as described in FIG. 2. The free parameters are the length of link 206, the length of the control link 204, and the length of link 210. As with the mechanical linkage device 100, in the mechanical linkage device 200 the link lengths between A and C and A and E need not be the same, but they are illustrated in FIG. 9 with the same link 210.

Figure 11:
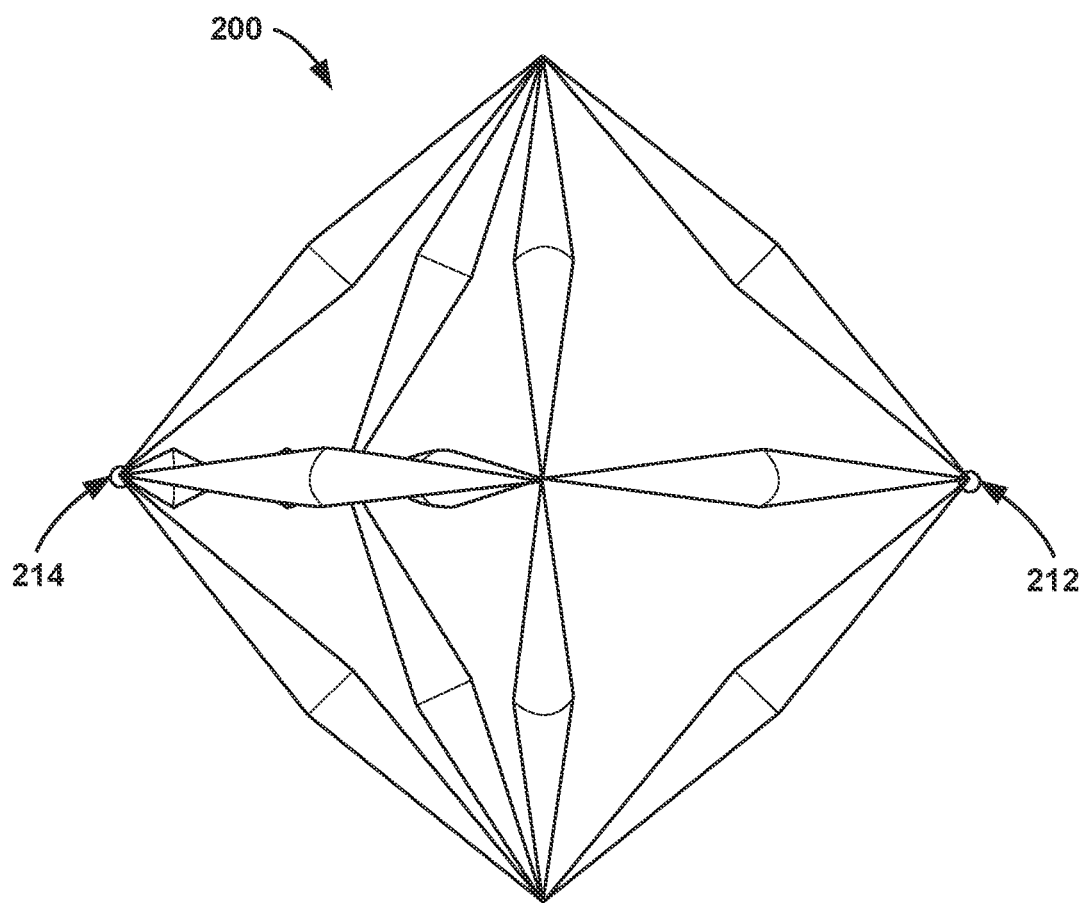
FIG. 11 illustrates a top view of the mechanical linkage device of FIG. 8, according to an example embodiment.
Figure 12:
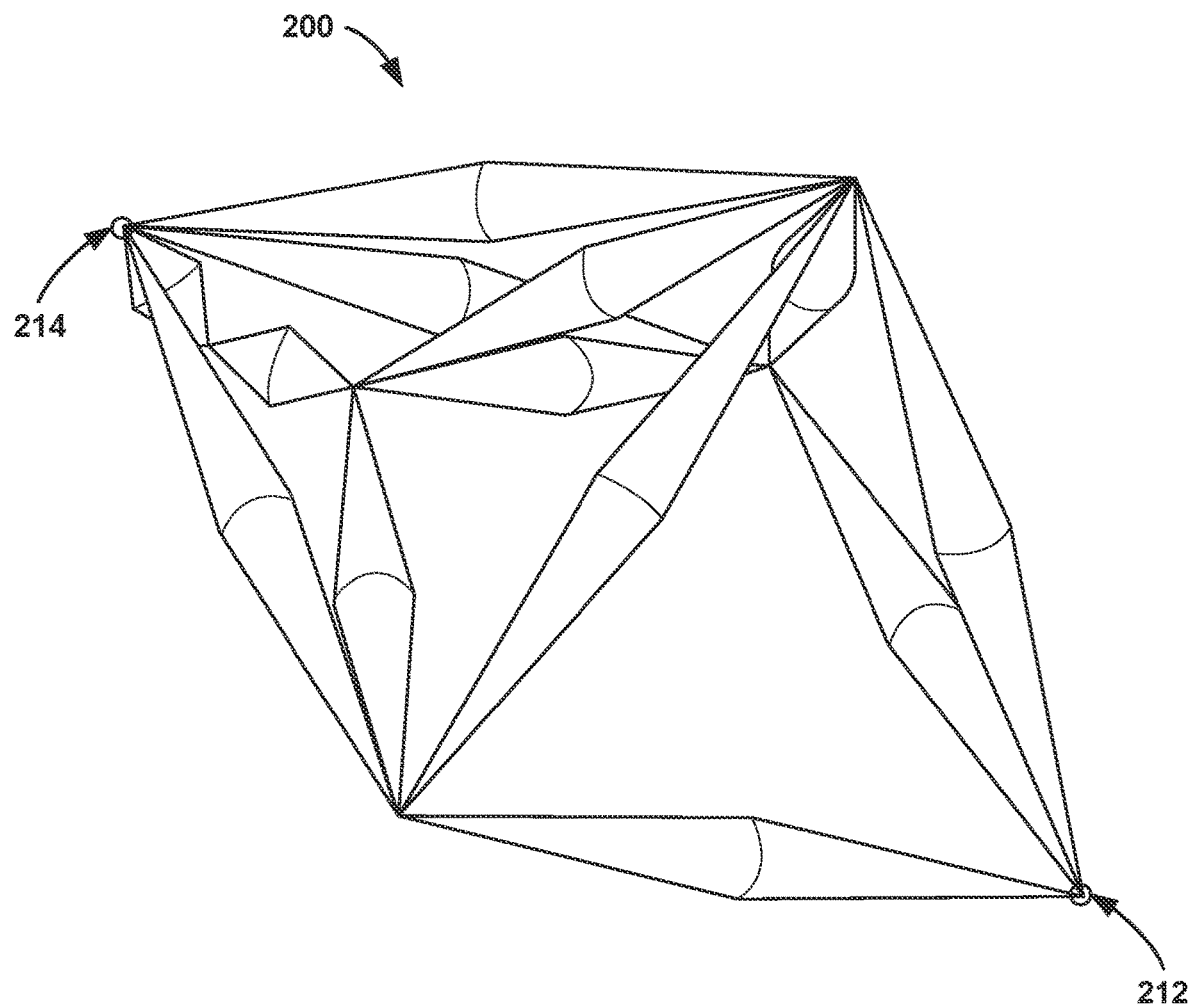
FIG. 12 illustrates another view of the mechanical linkage device of FIG. 8, according to an example embodiment.

In FIG. 10, the mechanical linkage device 200 is shown from the side as it transition from the neutral position down two different amounts. This configuration has an extremely large range relative to its characteristic length. In FIG. 11, the mechanical linkage device 200 is shown from the top with the control point 214 and the end point 212. In FIG. 12, the mechanical linkage device 200 is shown as the linkage is moved downward from an angle with the control point 214 and the end point 212. For both the mechanical linkage device 100 and mechanical linkage device 200, there is nothing requiring only 2 points such as A, E and C. Additional points could be added with the same constraint of connection to O, B and D and the linkage device would still work. Therefore, both the mechanical linkage device 100 and mechanical linkage device 200 could have additionally copies of the link 106, 206, link 110, 210, and link 108, 208 structures associated with the A, E, C points.

The mechanical linkage device 100 and mechanical linkage device 200 style structures may be made from mechanical links or living hinges, or a combination of the two. Various links may be connected via spherical joints that can be composed of items such as a sphere with magnets attaching the links, or compound links made with rotary joints. Anything that maintains the independent two-dimensional of freedom nature of the joints. The links themselves can have any profile and take any path between the two points they connect.

Figure 43:
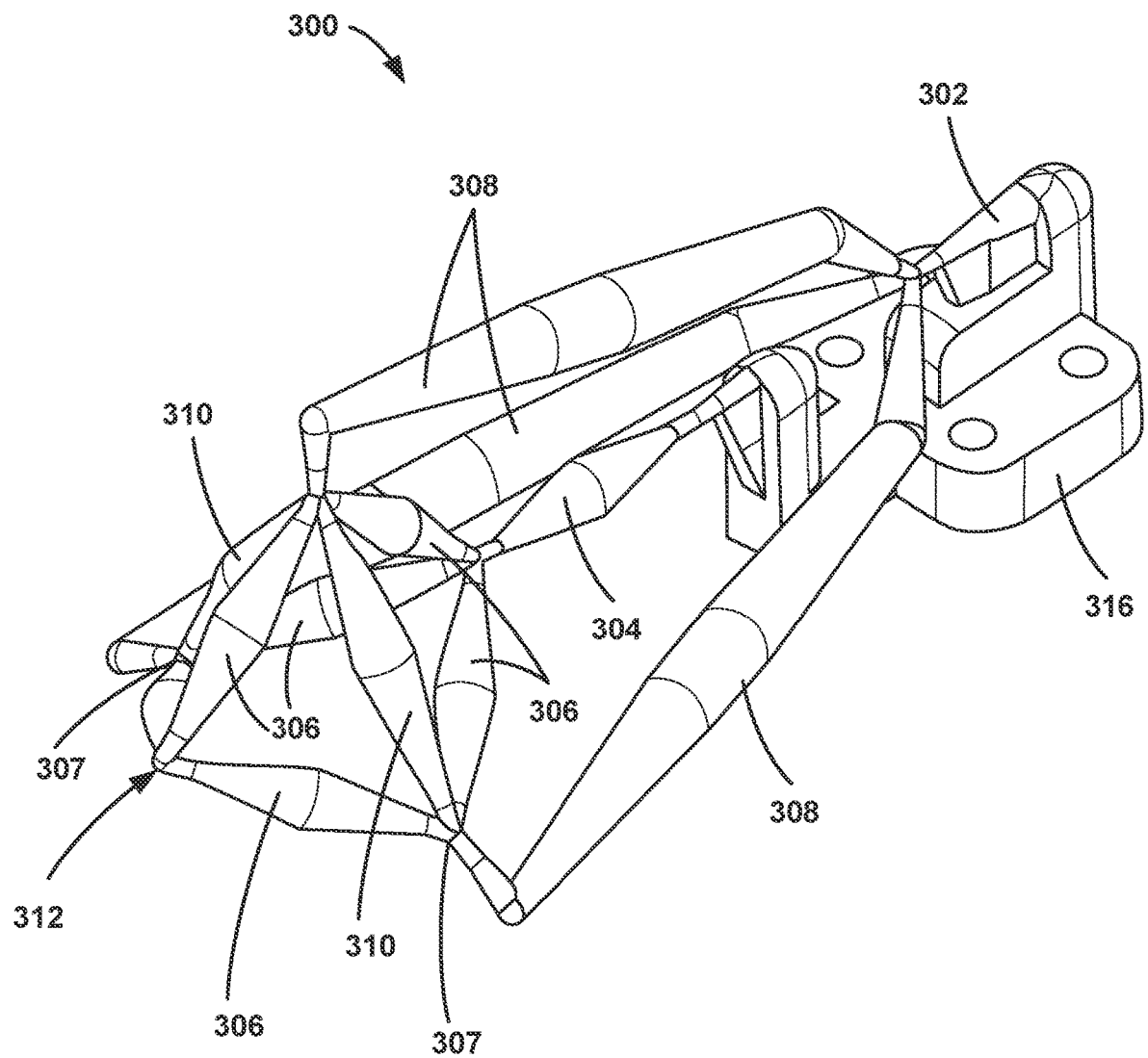
FIG. 43 illustrates another example mechanical linkage device, according to an example embodiment.
Figure 44:
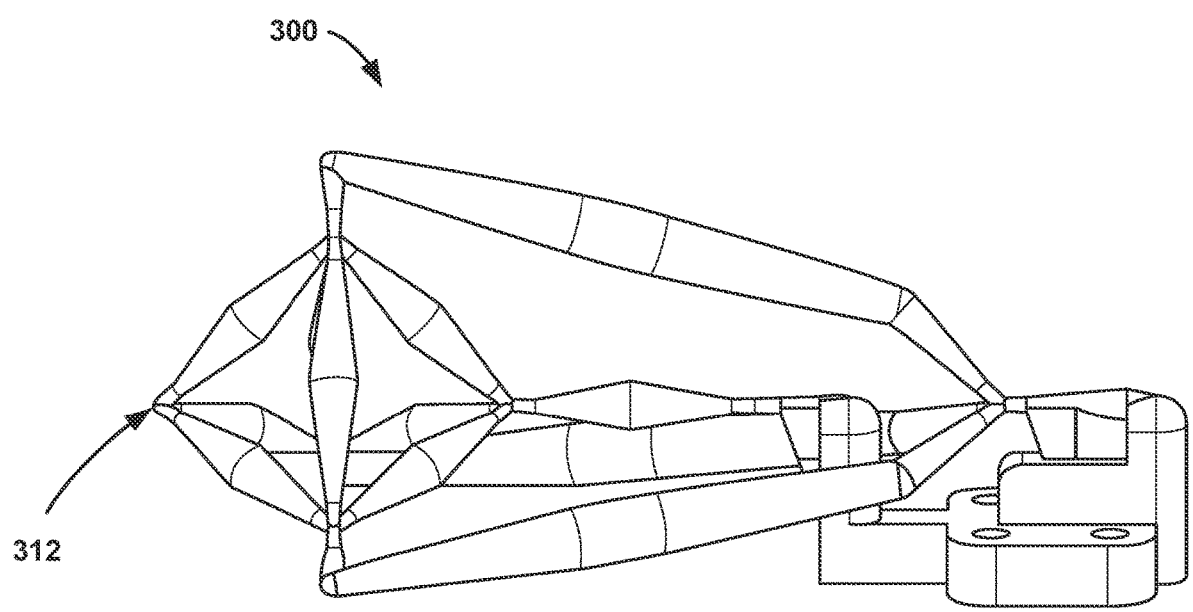
FIG. 44 illustrates a side view of the example mechanical linkage device of FIG. 43, according to an example embodiment.

One mechanical linkage device 300 including a living hinge embodiment can be seen in FIG. 43 where a base link 316 is modified to reduce the angle of incidence of the link 308. Link 308 does not follow a straight bath to points A, E, and C and has a variable profile via joint 307. The mechanical linkage device 300 includes a ground link 302, a control link 304, and links 306, 308, and 310, as shown in FIG. 43. FIG. 44 shows the same embodiment of the mechanical linkage device 300 from the side in the neutral position.

Figure 13:
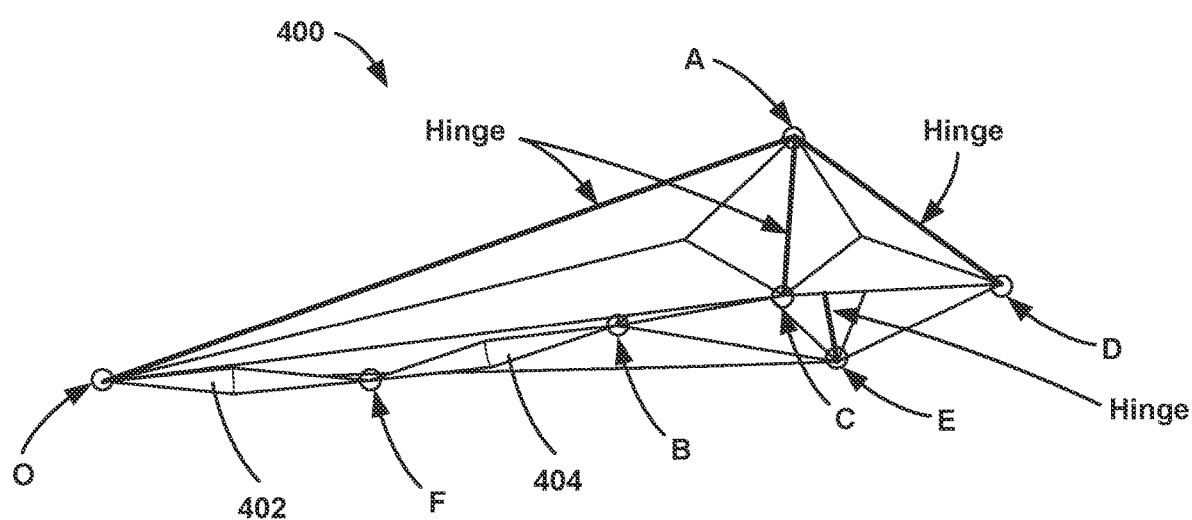
FIG. 13 illustrates another example mechanical linkage device, according to an example embodiment.

As discussed above, it is possible to construct the device with a combination of plates and linkages rather than constructing the device from linkages with spherical joint constrains. FIG. 13 illustrates an alternative embodiment of the mechanical linkage device 400, according to an example embodiment. As shown in FIG. 13, several of the links can be replaced by triangular plates. For instance, triangle TACO can replace the links between O and A, O and C, and A and C. This creates structure with Triangles TACO, TACD, TADE, TABC, TAEO, TABE. When the distance between A and E is the same as A and C, the triangles TACD, TADE, TABC, and TABE are labeled Triangle A and the triangles TACO and TAEO can be called Triangle B. Rather than have spherical joints connecting each link, the edges between these triangles can be connected with hinge joints. These hinge joints can be made from living hinges, piano hinges, or pin joints. The entire length of the hinge can be made from these methods or just a portion of it. The points O, F, and B have spherical joints. These spherical joints can be implemented as ball and socket, universal joints, compound rotary joints that have two spherical degrees of freedom, or compound hinge joints as non-limiting examples. There is no need for the entire plate, as the ends can be cut away so there is no need have the material at any of the labeled points. Only the relationship between the hinged edges the spherical joints needs to be preserved.

Figure 14:
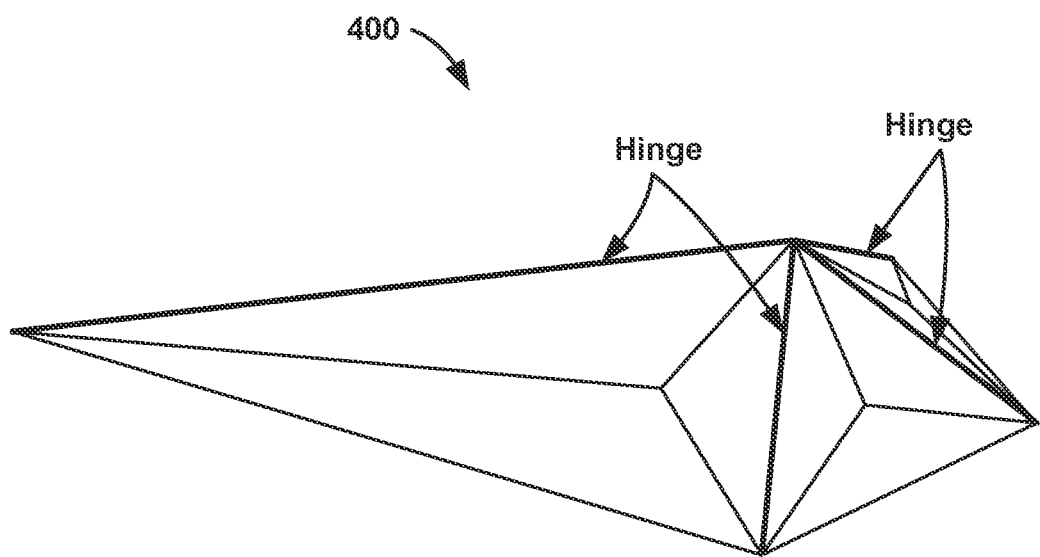
FIG. 14 illustrates various views of the mechanical linkage device of FIG. 13, according to an example embodiment.
Figure 15:
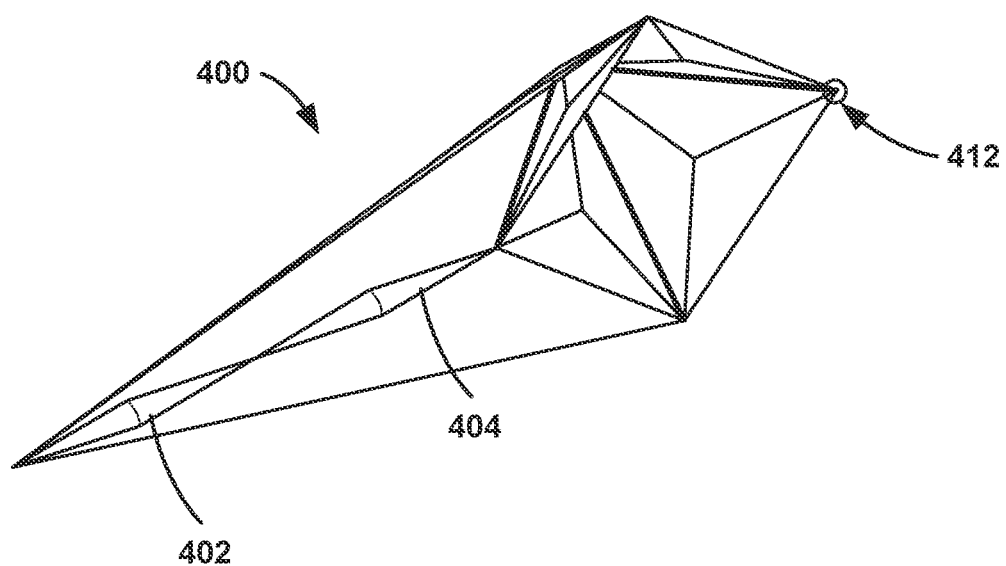
FIG. 15 illustrates various views of the mechanical linkage device of FIG. 13, according to an example embodiment.

On implementation of this plate-based design can be seen in FIG. 13 with the hinges, spherical joints, and ground link labeled. The mechanical linkage device 400 shown in FIG. 13 is the plate-based version of the mechanical linkage device 100. The same mechanical linkage device 400 is shown in FIG. 14 from an overheard angle. The mechanical linkage device 400 is shown in FIG. 15 from the bottom at an angle.

Figure 16:
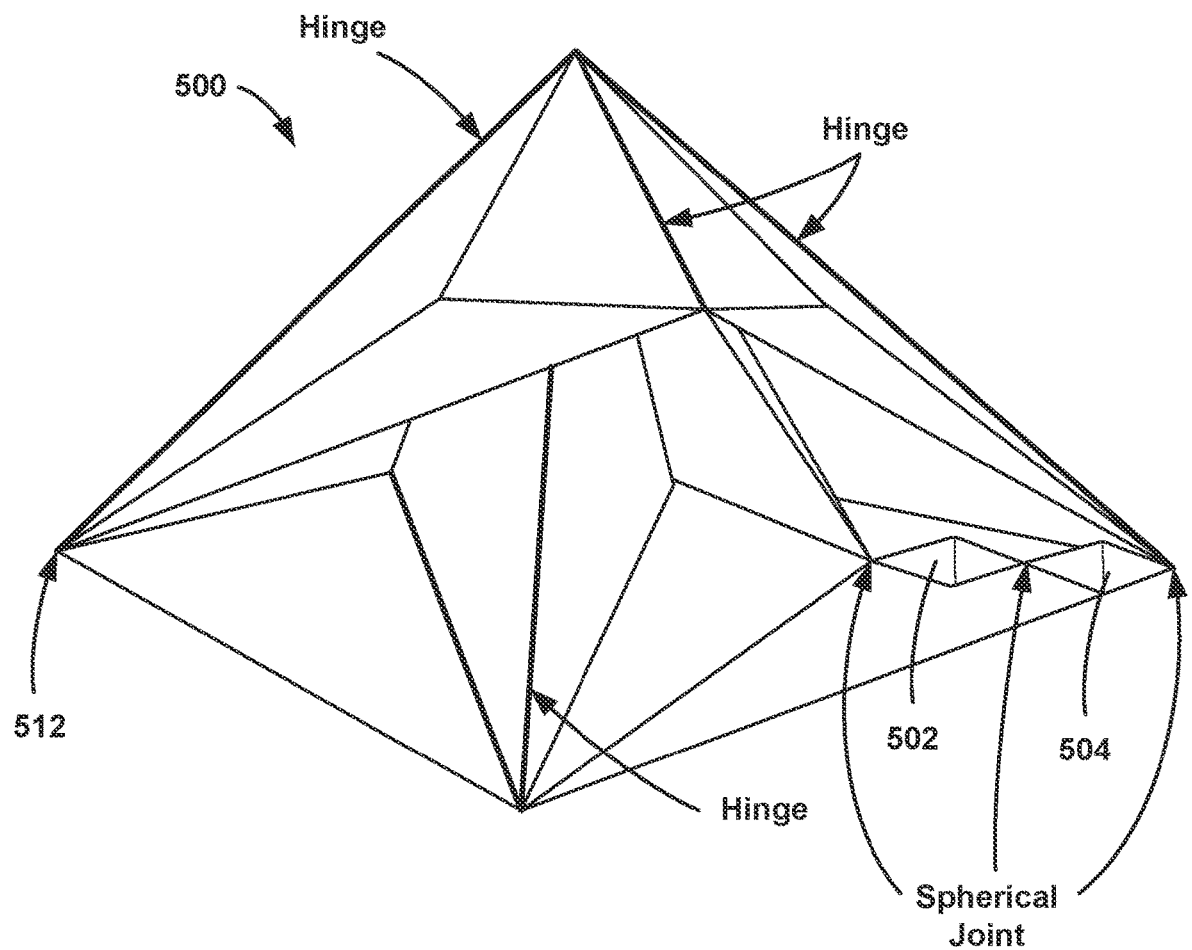
FIG. 16 illustrates another example mechanical linkage device, according to an example embodiment.
Figure 17:
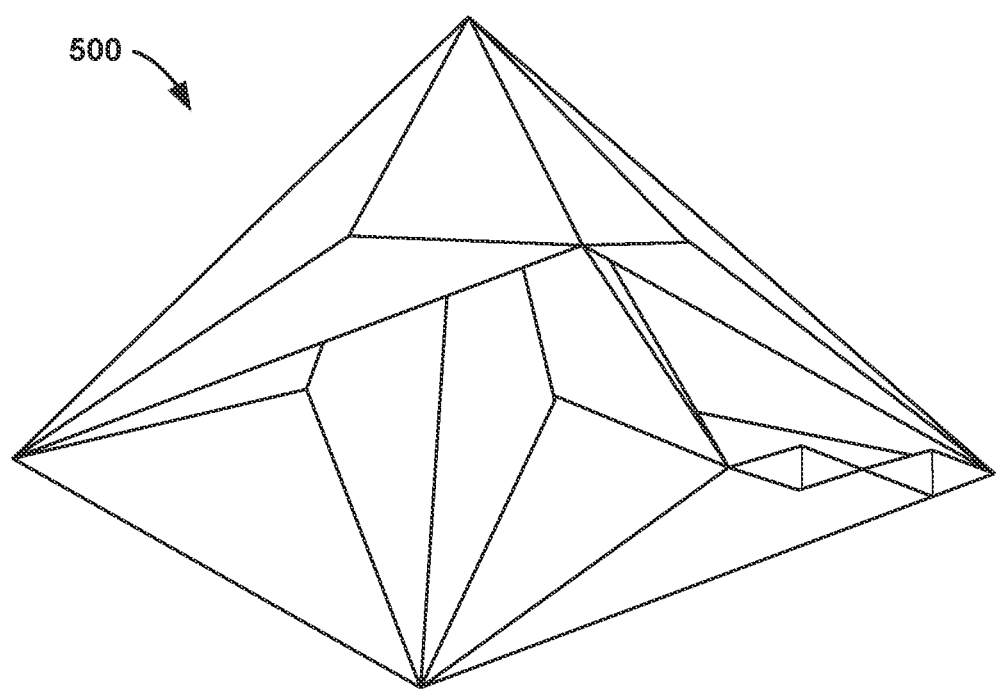
FIG. 17 illustrates another view of the mechanical linkage device of FIG. 16, according to an example embodiment.

The mechanical linkage device 500 shown in FIG. 16 is a plate-based version of mechanical linkage device 200 with the hinges, spherical joints, end point 512, ground link 502, and control link 504 labeled. FIG. 17 shows the mechanical linkage device 500 with the triangles A and B labeled. FIG. 18 shows the mechanical linkage device 500 moving upwards from a bottom view and the design in the neutral state from above.

Because the triangles need not be the entire length and need not include the points, and a triangle can be defined with just two sides and a fixed angle, the triangles shown in FIGS. 13-18 with two links for the sides and one link fixing the angle between them. As such, it is possible to make a version of the mechanism without the multiple intersecting spherical joints at point A and where all links can be composed from rods and simple plates.

Figure 19:
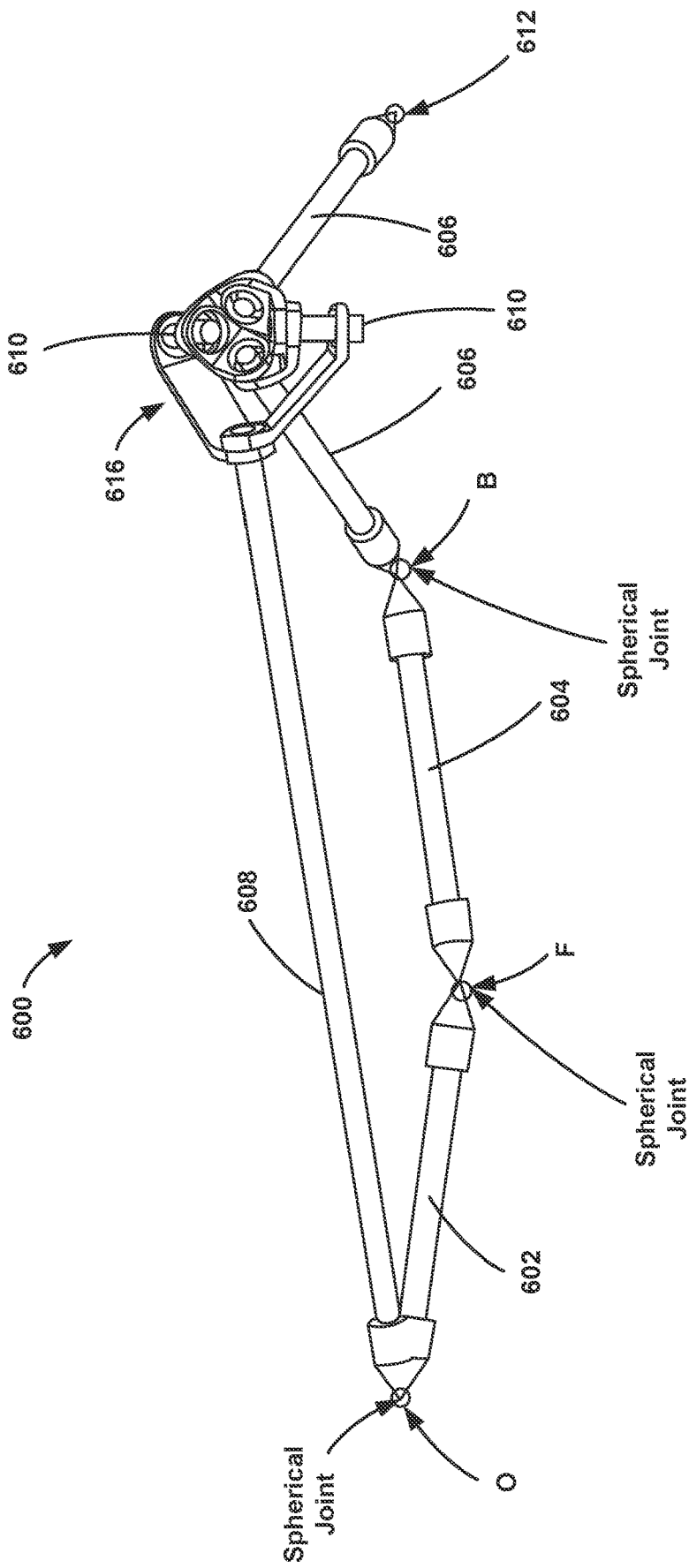
FIG. 19 illustrates another example mechanical linkage device, according to an example embodiment.

Such a mechanical linkage device 600 is shown in FIG. 19. The length of the links between point A and E and E and C are eliminated to simply an angle constraint. This structure means only the points O, F, B, and D exist on the mechanism, while the points A, E, and C become either remote centers or virtual points.

The mechanical linkage device 600 simplifies the design of the links, the size of the structure, and ensures that the end point 612 is on an exposed link, allowing for end effectors such as marking, measuring, or machining tools to be placed at the end point 612. The rotary link structure consists of a ground link 602 between O and F, a control link 604 between F and B, as well as several links that connect points B, D, and O to the compound joint 616. The compound joint 616 emulates the many spherical joints in the mechanical linkage devices 100, 200 around point A. The compound joint 616 can also be viewed as acting like the hinge joints in mechanical linkage devices 100, 200. Link 608 connects the compound joint 616 to point O, One copy of link 606 connects the compound joint 616 to point B and another copy of link 606 connects the compound joint 616 to the end point 612. The compound joint 616 has two internal links 610 that emulate the connection to points E and C from point A.

Figure 20:
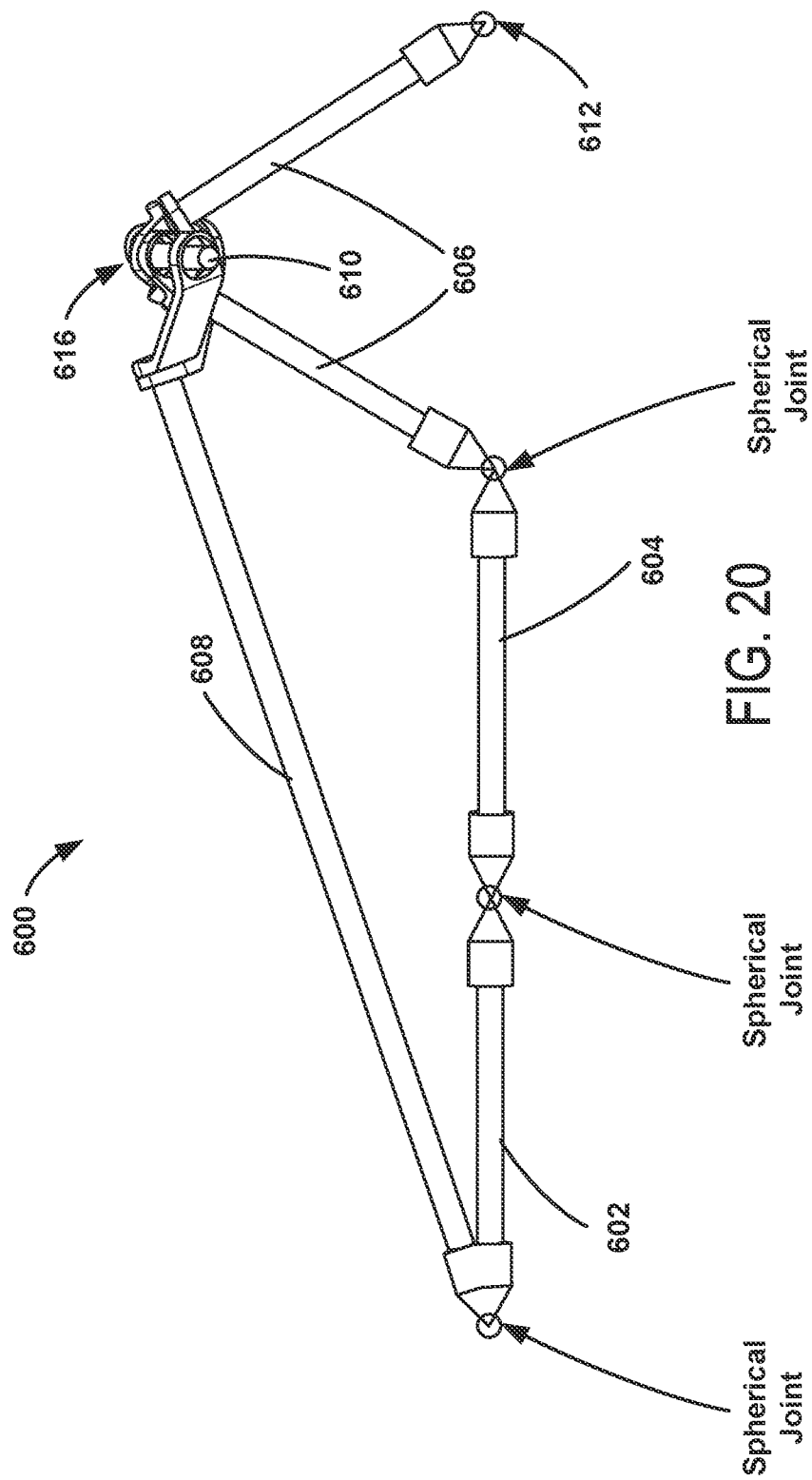
FIG. 20 illustrates another view of the example mechanical linkage device of FIG. 19, according to an example embodiment.

FIG. 19 shows one embodiment of this mechanical linkage device 600 design. This design is modeled off of mechanical linkage devices 100, 400. There can be an additional rotary link inspired mechanical linkage device which is similar in design and modeled off of mechanical linkage devices 200, 500. FIG. 20 provides a profile view of mechanical linkage device 600 when in the neutral position.

Figure 21:
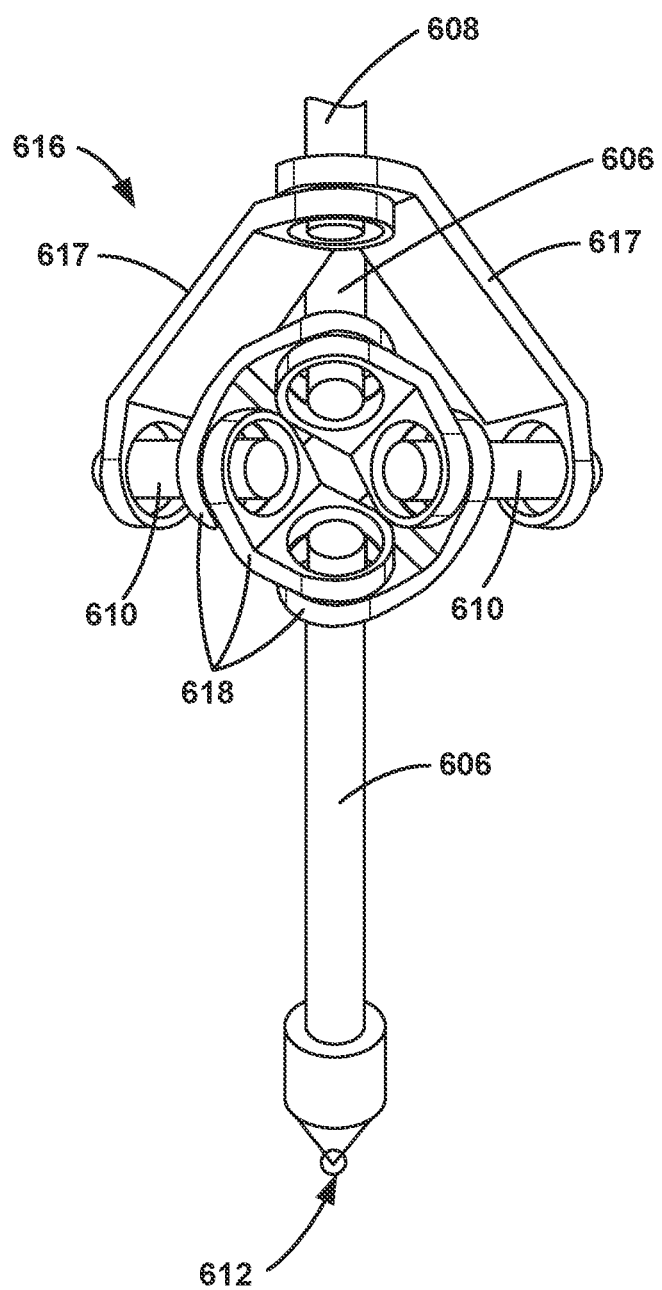
FIG. 21 illustrates a compound joint of the mechanical linkage device of FIG. 19, according to an example embodiment.

FIG. 21 provides a close up view of the compound joint 616 of the mechanical linkage device 600. In the compound joint 616, core links 618 connect a link B type to a link D type and enforce the angle constraint of a triangle connected to point A and a combination of E, C, D, and B points. These core links 618 can have one side fixed to one link and other side is a rotary joint connected to the other link. Alternatively, both sides can be connected by a rotary joint to their respective links. These core links 618 can connect to the link 610 and link 606 anywhere along their length and can take any valid path that doesn't intersect with the other links. In FIG. 21, they are shown as bend plates with holes concentric with link 110 and link 606. Core links 618 emulate A type triangles. The other links, side links, help emulate B type triangles and connect to link 608 and link 610. These links can take any path and connect with the links at any point as long as it doesn't interfere with other links and enforces the angle constraint of the B type triangle. One side link 617 must have both ends attached through rotary joints, while the other side link 617 can rigidly attach to link 108 and must have a rotary attachment to link 110. In FIG. 21, an embodiment is shown where the rotary attachment is represented as concentric holes. In implementation, those holes may be filled with a bearing surface or a mechanical bearing. Multiple core and side links can enforce these constraints to provide added rigidity and redundancy.

Figure 22:
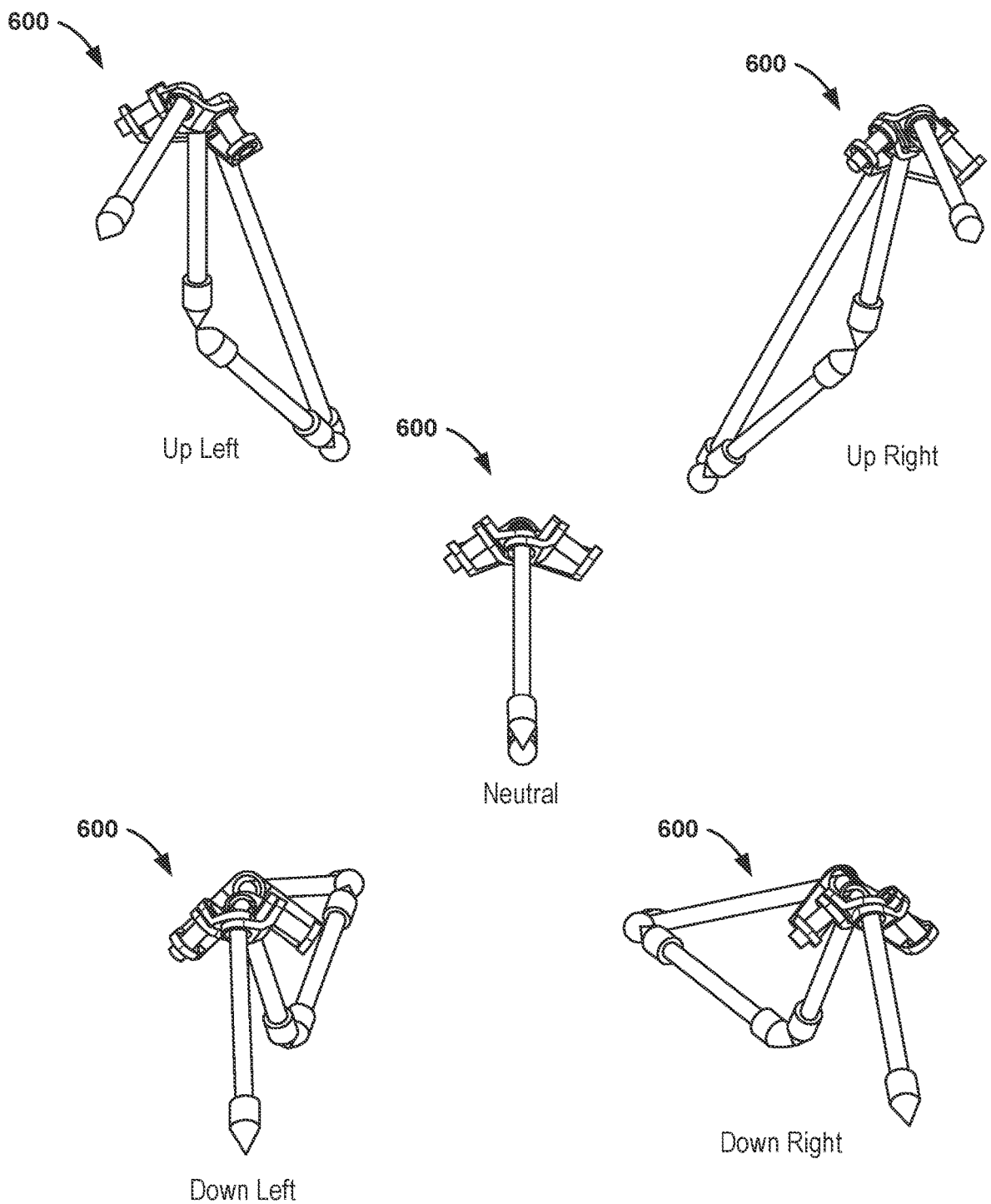
FIG. 22 illustrates various views of the example mechanical linkage device of FIG. 19, according to an example embodiment.
Figure 23:
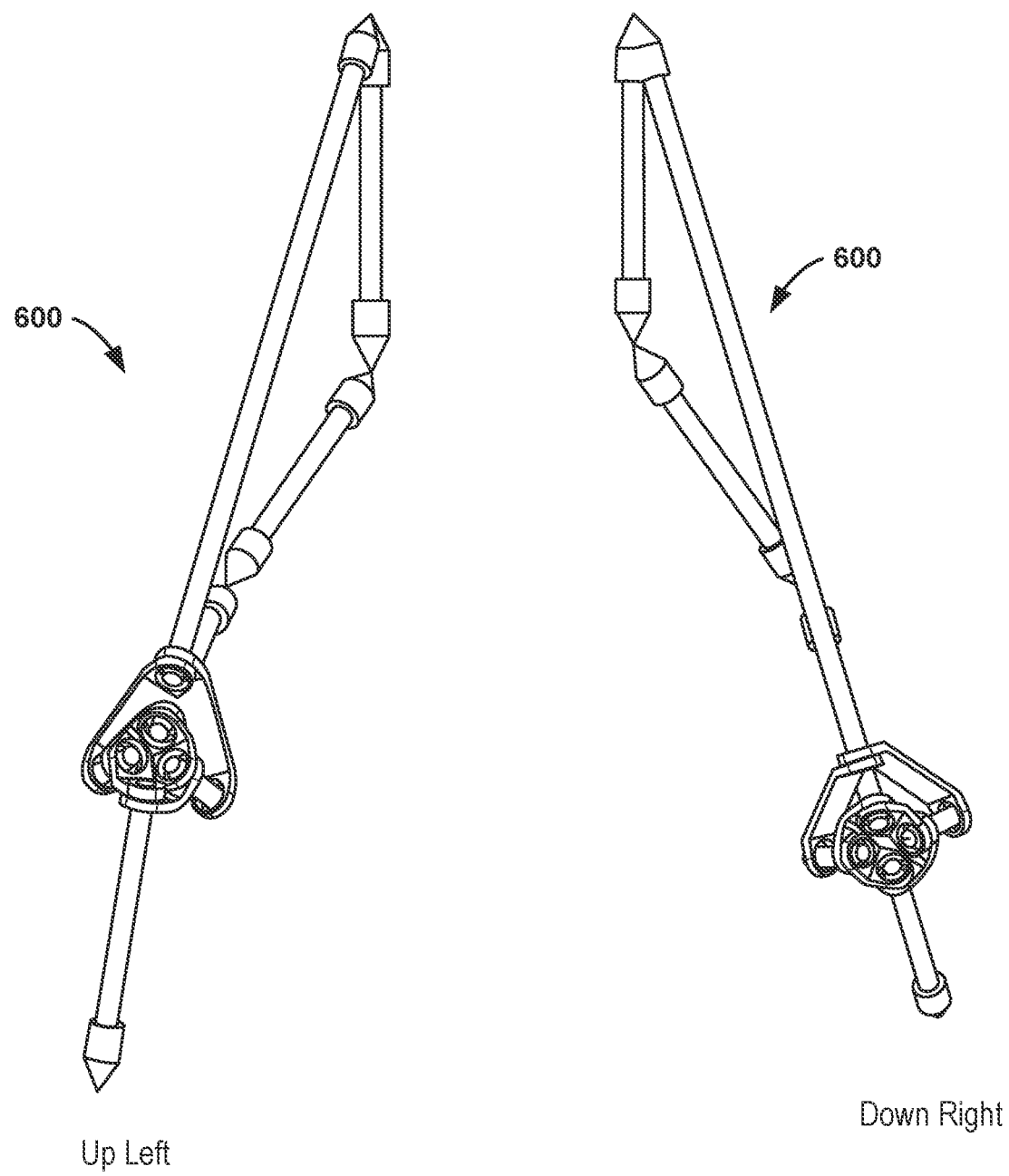
FIG. 23 illustrates various views of the example mechanical linkage device of FIG. 19, according to an example embodiment.

FIG. 22 provides a view of the mechanical linkage device 600 in its neutral state and several moved states. FIG. 23 provides a view of the mechanical linkage device 600 in two moved states from above.

Figure 24:
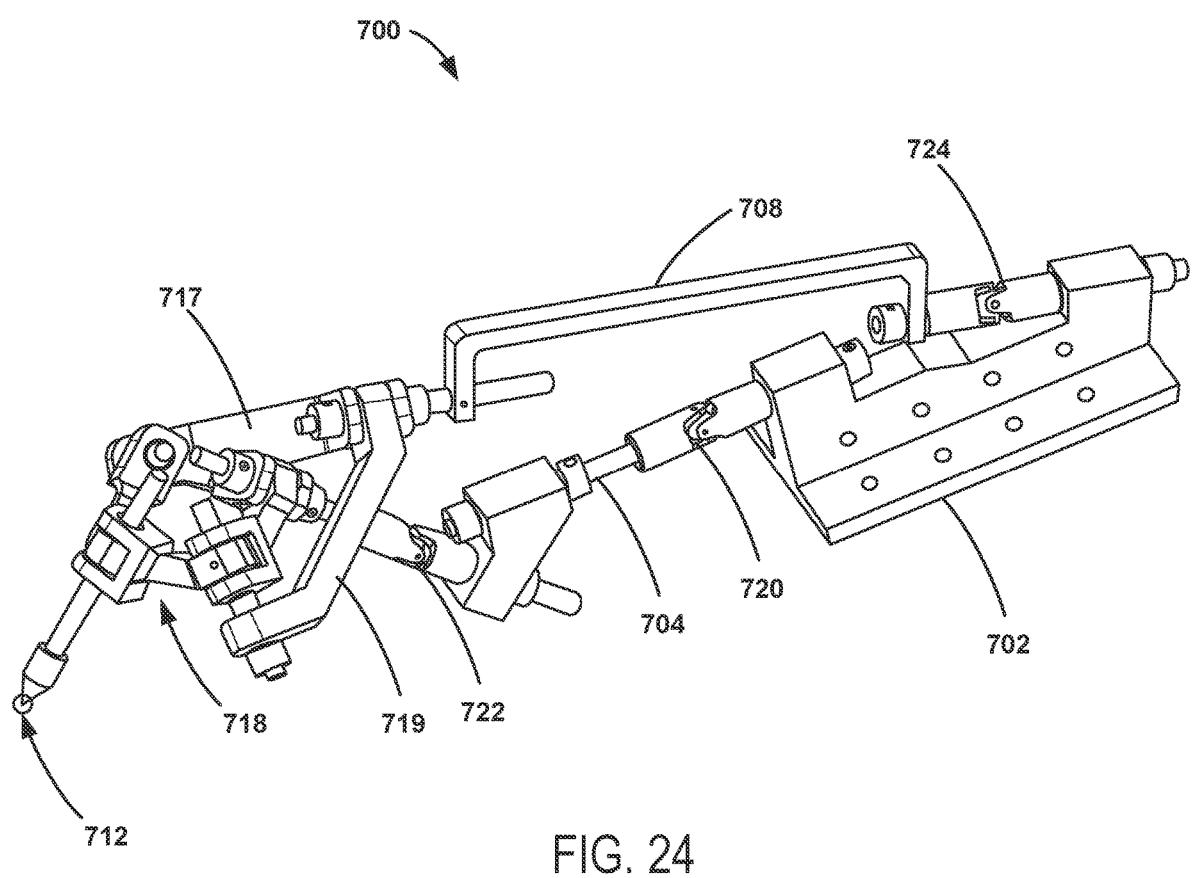
FIG. 24 illustrates another example mechanical linkage device, according to an example embodiment.

FIG. 24 shows another mechanical linkage device 700. In the mechanical linkage device 700, the spherical joints are implemented as universal joints 720, 722 that consist of a three-part assembly of rotary joints. The control link 704 is decomposed into a block connected to two universal joints 720, 722 at points F and B respectively, and two shafts that interlock into the joints. The ground link 702 is expanded to include mounting hardware and is moved to reduce the angle the universal joint 724 at point O must have. To allow for greater range of motion, link 708 is a compound structure consisting of two aligned shafts connected to a common compound, allowing the link 708 to take a curved path and not intersect with the ground link 702.

Figure 25:
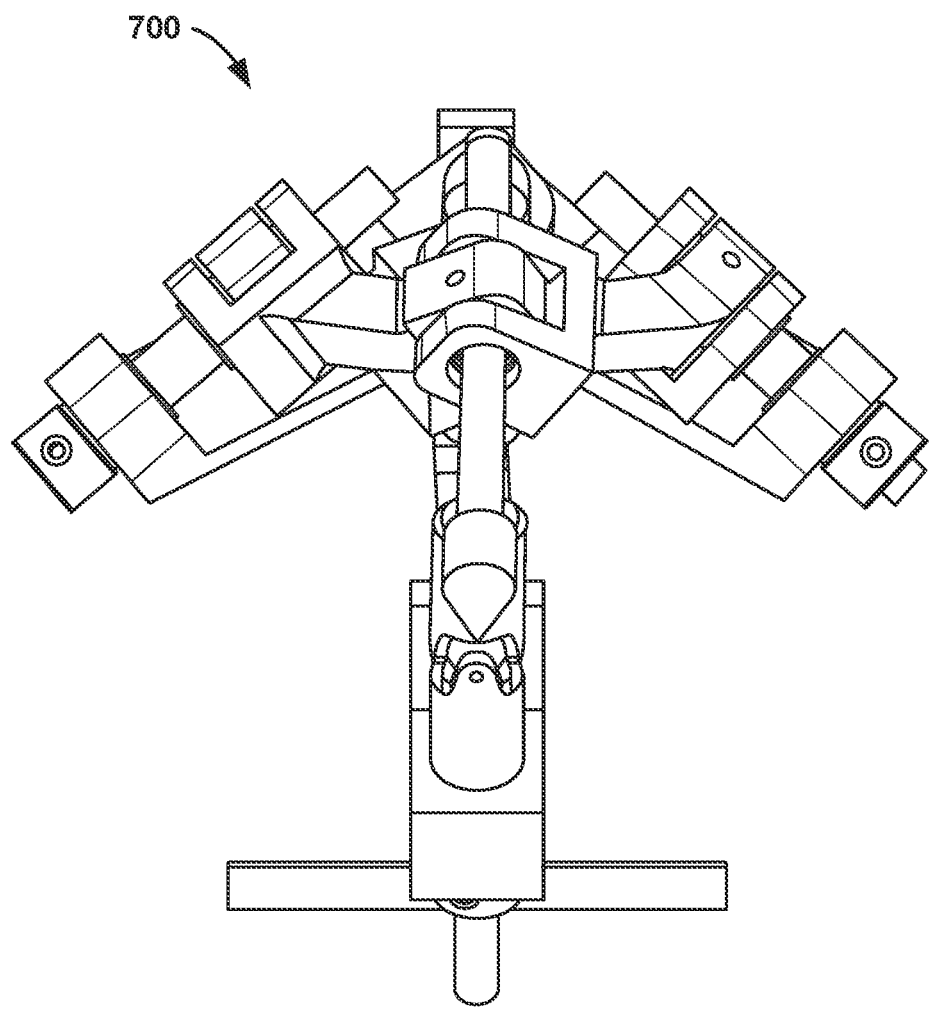
FIG. 25 illustrates a front view of the mechanical linkage device of FIG. 24, according to an example embodiment.
Figure 26:
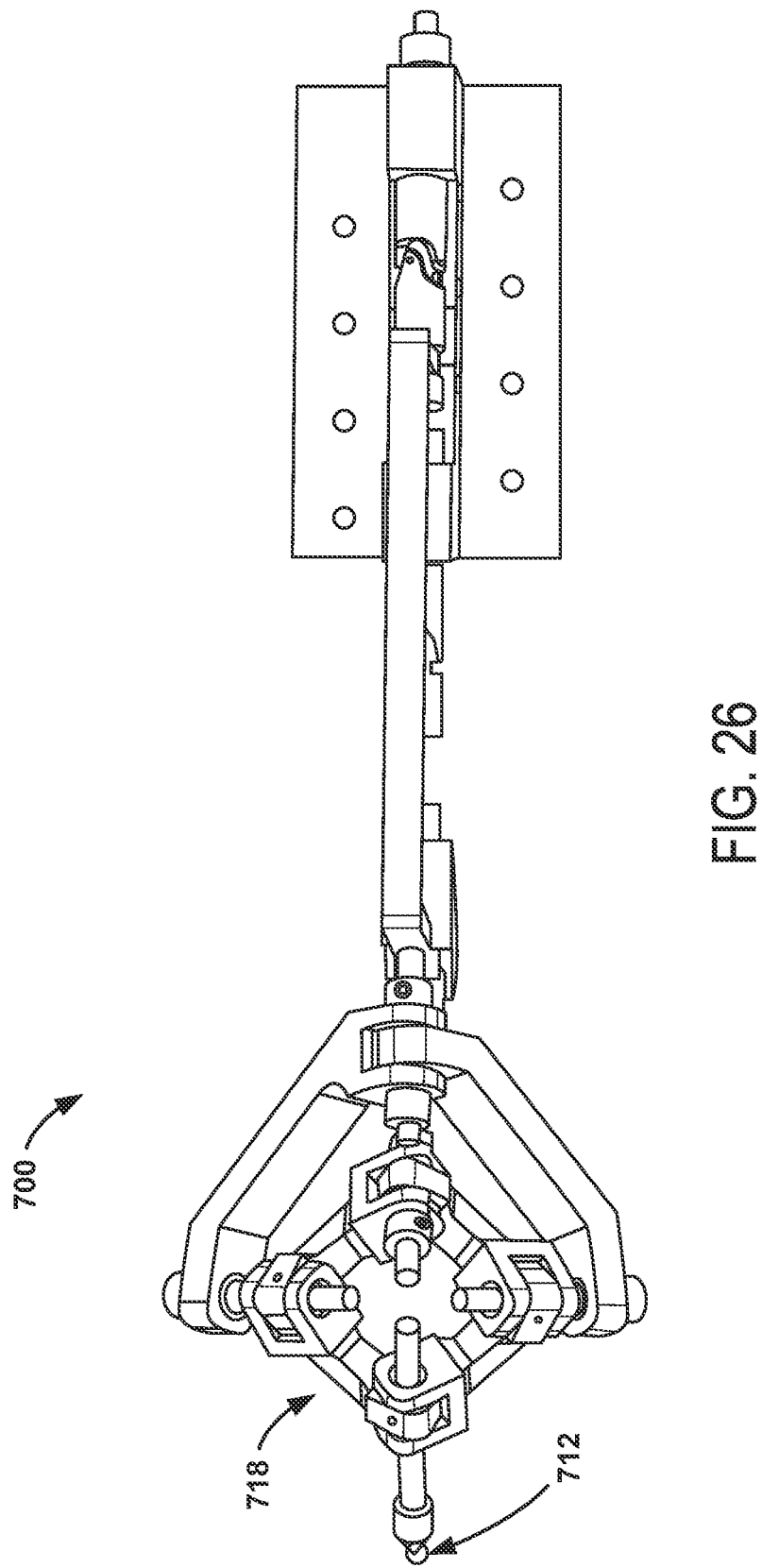
FIG. 26 illustrates a top view of the mechanical linkage device of FIG. 24, according to an example embodiment.
Figure 27:
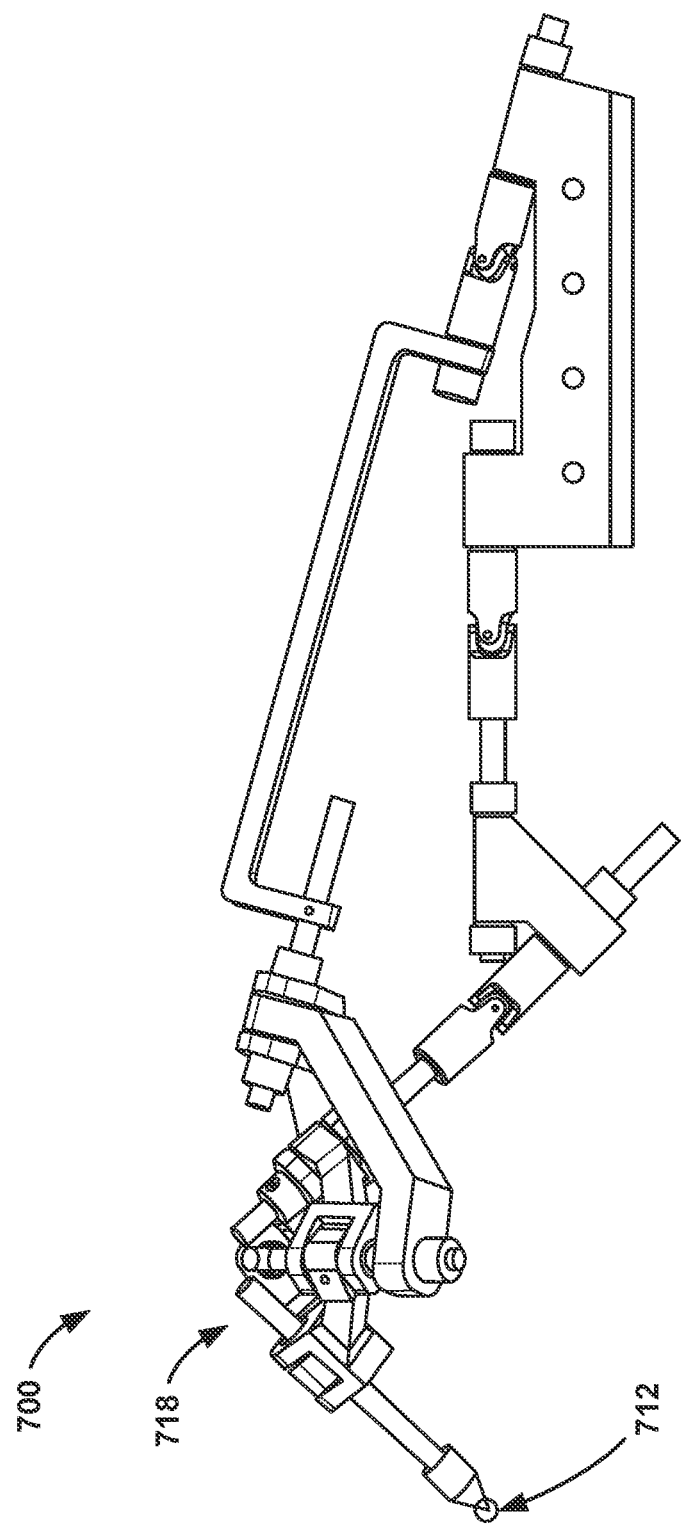
FIG. 27 illustrates a side view of the mechanical linkage device of FIG. 24, according to an example embodiment.

The compound joints 716 consists of interlocking identical core links 718 and two non-identical side links 717, 719 that interlock and have a rotary attachment to both link 708 and link 710. FIG. 25 shows the mechanical linkage device 700 from the front in the neutral state. FIG. 26 shows the mechanical linkage device 700 from the top in the neutral state. FIG. 27 shows the mechanical linkage device 700 from the side in the neutral state.

Figure 28:
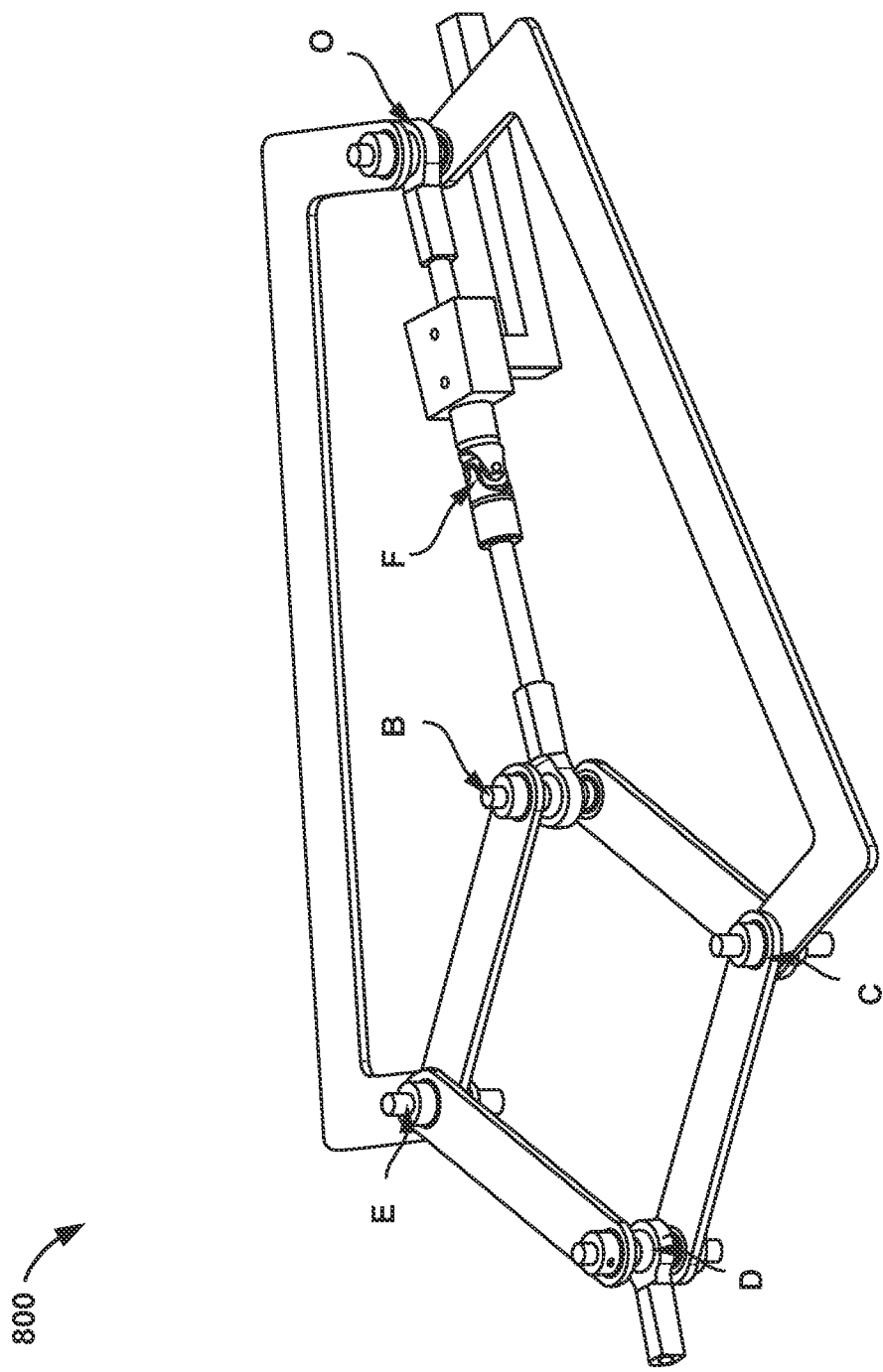
FIG. 28 illustrates another example mechanical linkage device, according to an example embodiment.

All previous description of the present disclosure relied on three or more points connected to a sphere Sf by links from both points O and B. However, if you constrain two points E and C to lie in the same plane as O, B and D at all times, then you can produce the same effect as the linkages described above. This is because if you force points E and C to lie in the same plane as O, B and D, you only need two points, E and C for the construction of the collinearity of B, D and O. This is illustrated in the mechanical linkage device 800 shown in FIG. 28 with the points B, C, D, E, F and O labeled. To implement this links connected by rotary joints must connect E to B, B to C, C to D, D to E, C to O and B to O. There must still be spherical connections between B and F and O and F.

This design is similar to the mechanism known as the Peaucellier-Lipkin (PL) linkage. However, unlike the PL linkage, the mechanical linkage device 800 relies on spherical joints to trace out the movement of points B and O on the same sphere Sf. The PL linkage requires the structure to be made entirely of pin joint constraints, moves along a circle in the plane and the entire mechanism exists solely in 2D. However, the PL linkage has never been generalized to work to constrain a point to move on a plane. Part of the reason is that the simple generalization would have the end point 812 inside of a pin joint link making the constraint less useful. In the case of planar mechanisms, the pin link can be easily connected to other links to devices. To make use of the point constrained to the plane here, one needs to connect it with a ball joint or other means. By comparison the mechanical linkage devices 100, 200, 400, 500, 600, and 700 directly expose the end point 812 for connection and application.

Figure 29:
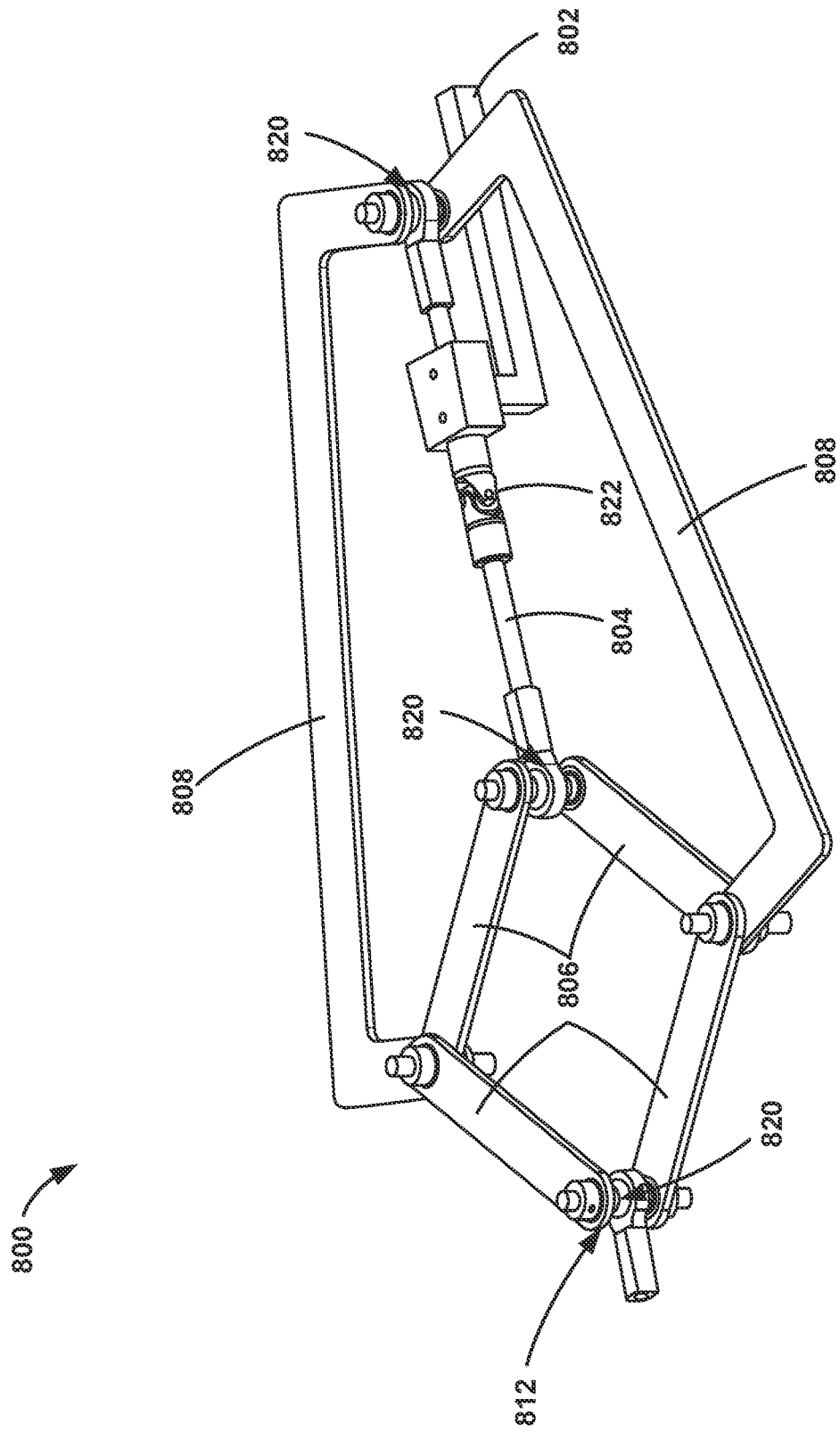
FIG. 29 illustrates various components of the mechanical linkage device of FIG. 28, according to an example embodiment.

FIG. 29 shows the mechanical linkage device 800 where the points B and D are on the same side of the sphere Sf and link 806 connects with rotary joints to each other and to link 808. Link 808 connects points E and C to point O. B is connected via a ball joint 820 and the control link 804 to a universal joint 822 at point F. Ball joints 820 allow for the control link 804 to make contact at angle with point B and for the ground link 802 to connect to link 808 at any angle at point O. The ground link 802 is extended out beyond the mechanism for easier attachment. An optional third ball joint 820 is attached at the end point 812 to allow any other item to connect to the end point 812 and reference its movement in the movement plane. In an alternative embodiment, the mechanical linkage device 800 can be made so that points B and D are on opposite sides of the sphere Sf, similar to the arrangements shown in mechanical linkage devices 200, 500. FIG. 30 shows several front views of the mechanical linkage device 800 while moved from neutral. FIG. 31 shows the mechanical linkage device 800 mechanism at neutral and moved.

One potential use of the mechanical linkage device 800 is for holding two planes a fixed distance apart while allowing for translation and rotation. If three or more mechanical linkage devices 800 are attached to two planes, such that the end point 812 is referenced on one side and the ground link 802 on the other, then the two planes will be constrained to stay parallel to each other but may translate or rotate. The connection the end point 812 can be made using a ball joint or similar mechanism. The ground links 802 can be directly connected to the other plane.

When the movement of the point B is constrained to a circle passing through the point O, then the end point 812 will move along a straight line. This movement can be enforced by converting the joint centered on F into a rotary joint. The plane of movement of the rotary joint will then define the plane in which the line traced by the end point 812 will move through. It is useful but not necessary to constrain the joints at point B and O to also be rotary joints with movement in the same plane as the joint at F. The constraint to a plane can be made by using living hinges, discrete rotary joints, pin joints or hinge joints at point F. It is also possible to make a configurable joint at F, B, and O such that the plane in which the end point 812 moves as a straight line can be adjusted. The resulting movement would be seen as the angle of the line in the movement plane "PMovement" changing. This constraint can be applied to any of the mechanical linkage devices described above.

The mechanical linkage device 800 would be implementations of the PL linkage if all joints at O, F, and B are in the same plane as E, C, and D. By maintaining the joints out of plane, or maintaining the ball joints at O or B, the system would not be a devices described a as PL linkage since the plane of the links would be different from the plane that contains the movement of the end point 812.

Figure 32:
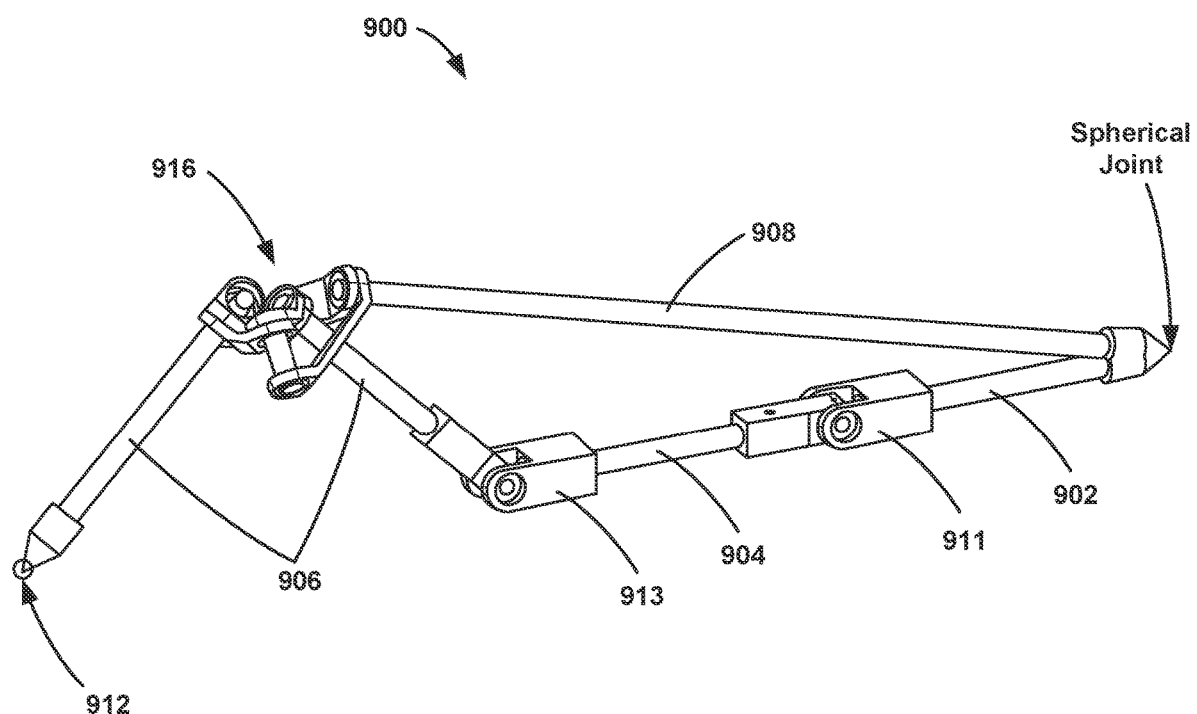
FIG. 32 illustrates another example mechanical linkage device, according to an example embodiment.
Figure 33:
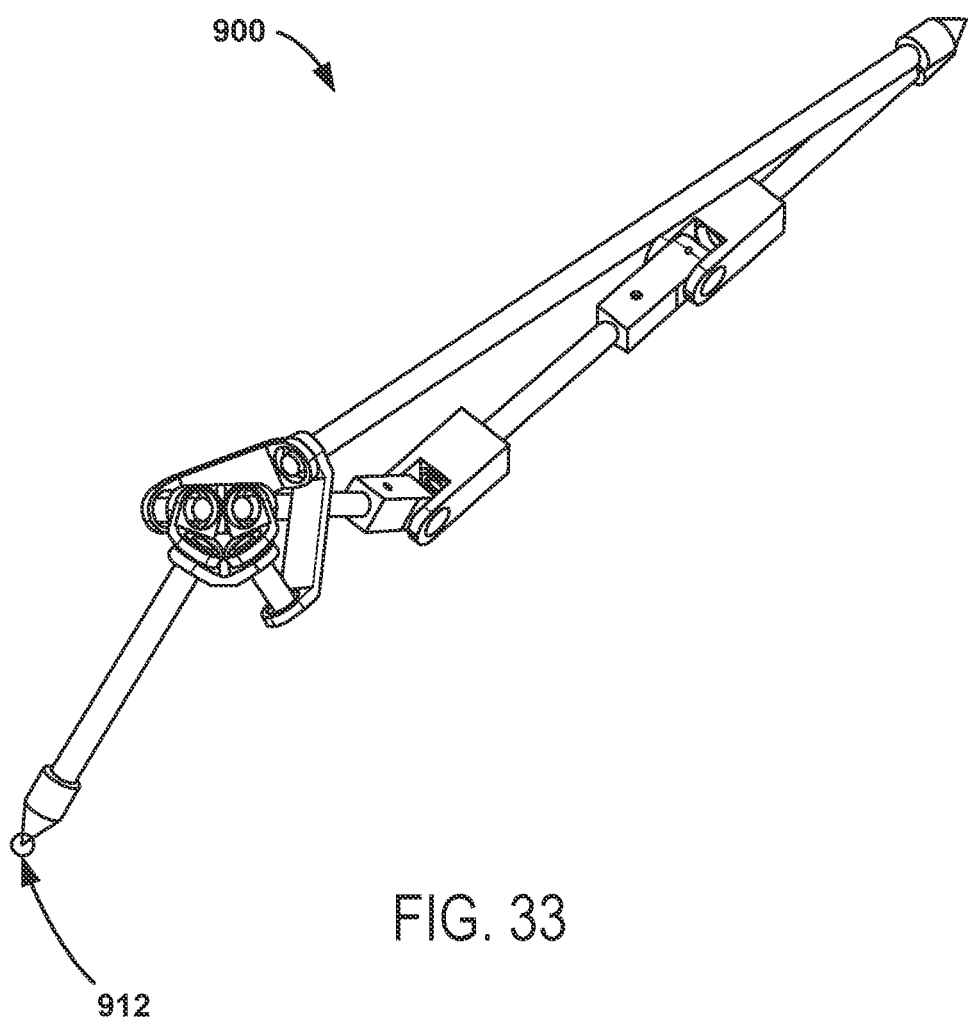
FIG. 33 illustrates another view of the example mechanical linkage device of FIG. 32, according to an example embodiment.
Figure 34:
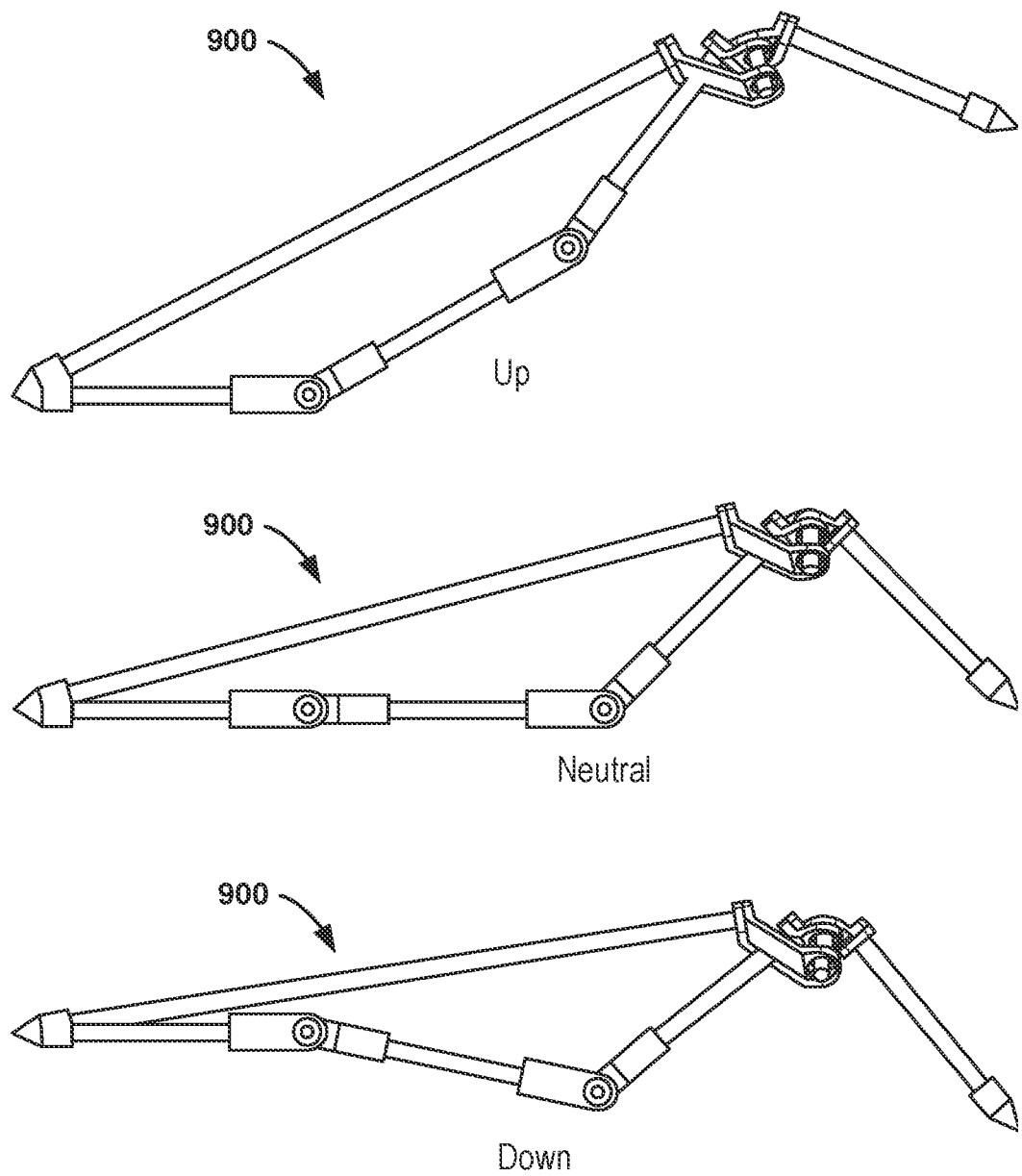
FIG. 34 illustrates various views of the example mechanical linkage device of FIG. 32, according to an example embodiment.

FIG. 32 shows one embodiment of converting the perfect plane mechanisms into a straight-line mechanism by replacing the joints at both F and B with rotary joints 911, 913. The mechanical linkage device 900 of FIG. 32 would have the point D move in a straight line in the same plane as points A, B, F, and O. Unlike the PL linkage, the end point 912 is exposed and the entire mechanism does not like in the plane. Instead, the compound joint 916 centered on point A provides the constraints on the system. FIG. 33 provides an additional view of the mechanical linkage device 900 in the neutral position. FIG. 34 shows the mechanical linkage device 900 in the neutral position and moved upwards and downwards.

Often it is useful to move not just a point in a plane, but an entire section of a plane. This can be viewed as moving a rigid body which normally has six degrees of freedom and constraining it to three degrees of freedom in a single plane. By connecting three or more perfect plane mechanisms to each other at the ground link, and their end point to the same rigid body, the resulting rigid body will be constrained to move in the movement plane which is normal to, and a fixed distance away from the ground link. The end result is we can define a plane by fixing the position of the ground link. The alignment of the ground links must be such that the points D of each mechanism exist in parallel planes or in the same plane. The preferred embodiment of this is when the three mechanisms share the same point O and F.

Anything can be connected to the plane section or rigid body such as a measurement device, machining tool, or 3D printer extruder. By actuating the device, we can produce CNC equipment such as 3D printers or CNC mills that don't rely on rails for movement. This can greatly aid in the production of larger or smaller scale devices since rail movement systems do not scale well with length.

Figure 35:
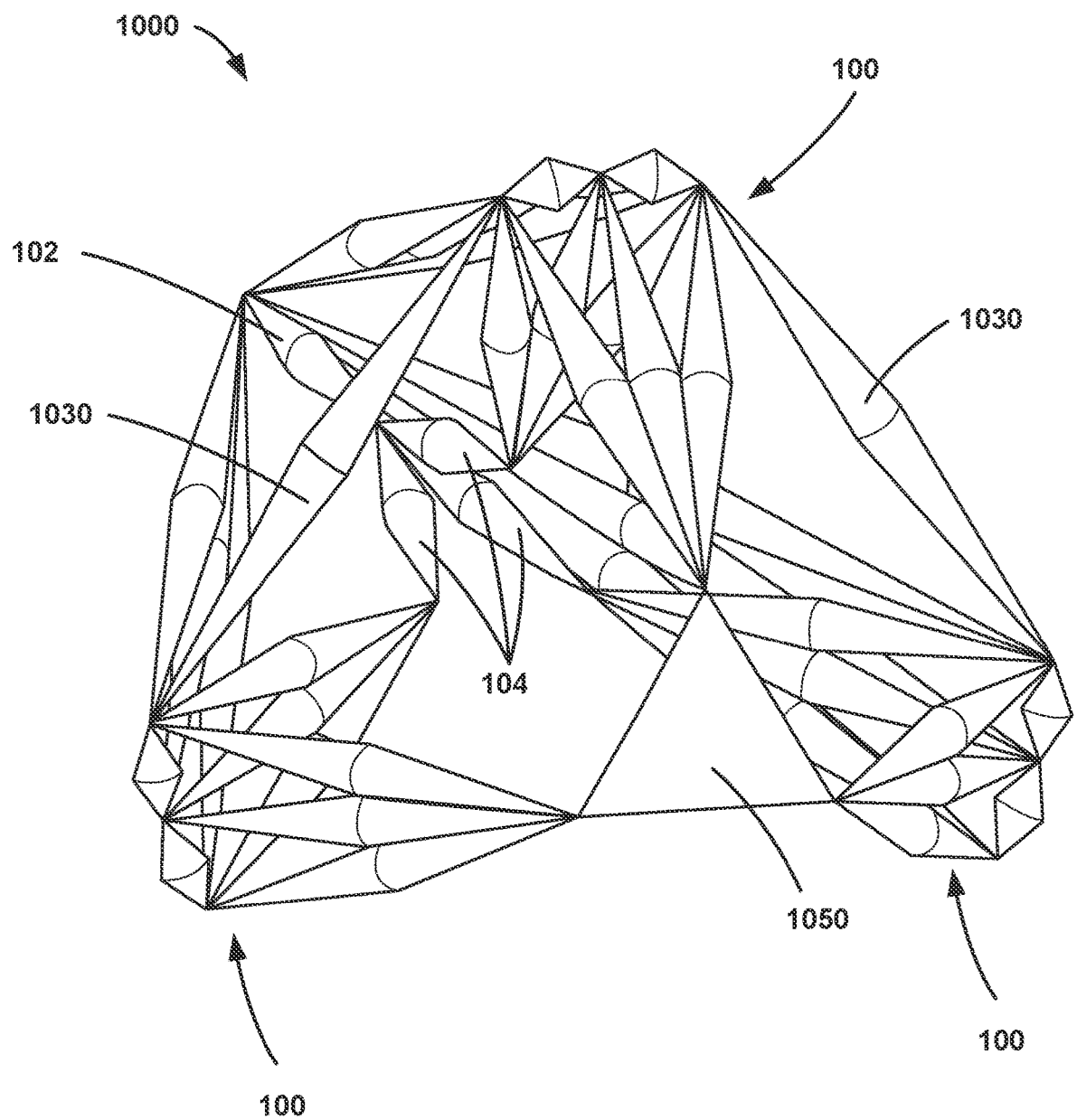
FIG. 35 illustrates another example mechanical linkage device, according to an example embodiment.

In FIG. 35, we see an example mechanical linkage device 1000 with three variants of mechanical linkage device 100 with link 110 that are connected to share the same ground link 102 with the same points F and O. Although FIG. 35 is shown with three of mechanical linkage device 100, other numbers or types of any of the perfect plane devices described herein are possible. The point D of the three different mechanical linkage devices 100 are connected to a plane section represented as a triangle 1050. While the three mechanical linkage devices 100 need not be connected, the mechanical linkage device 1000 shown in FIG. 35 includes a link 1030 that connects the point C of one mechanism to the point E of the neighboring mechanisms. There is one less link 1030 than number of mechanical linkage devices 100 (in FIG. 35, there are two links 1030 since there are three mechanical linkage devices 100).

Figure 36:
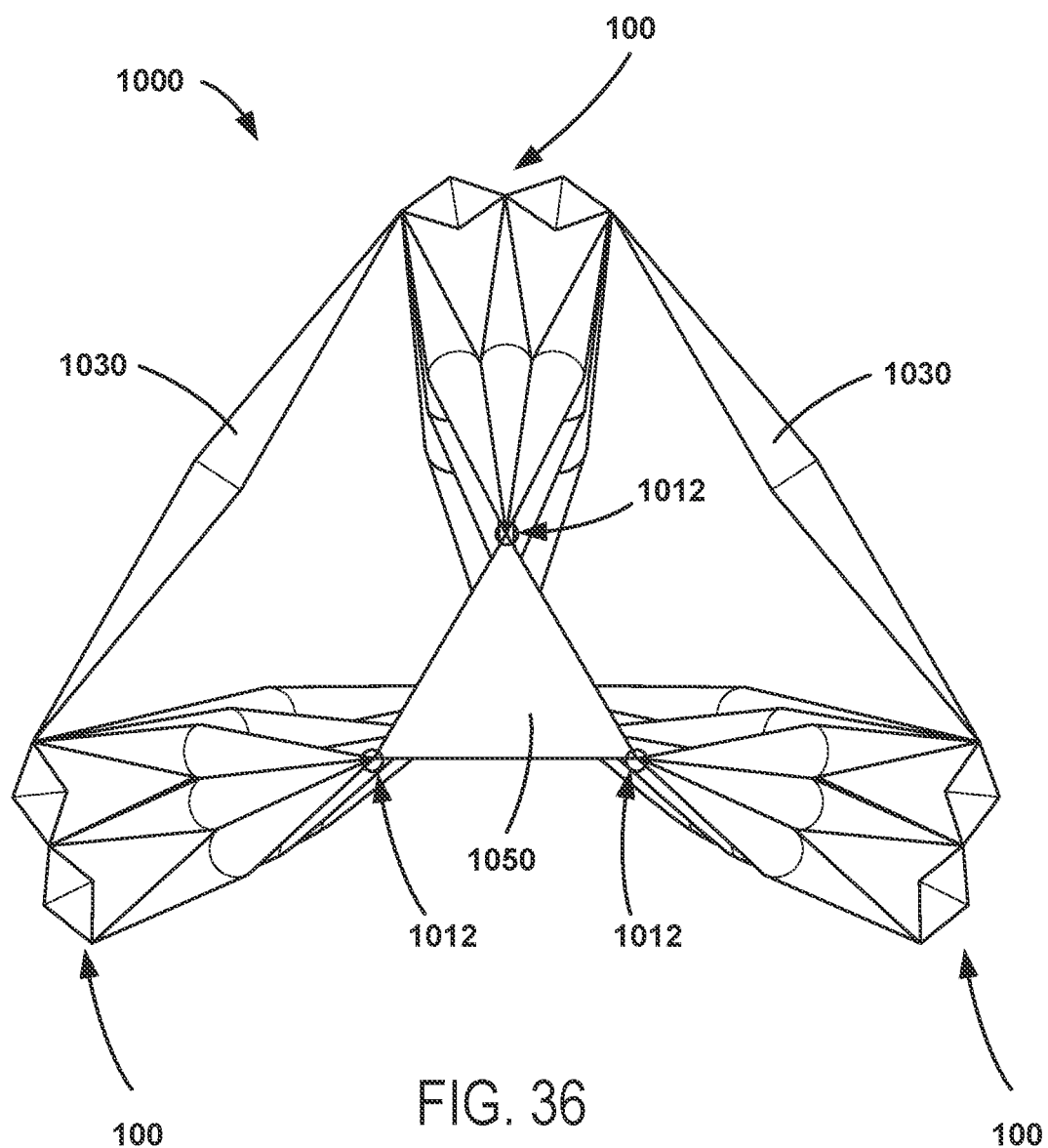
FIG. 36 illustrates a front view of the example mechanical linkage device of FIG. 35, according to an example embodiment.
Figure 37:
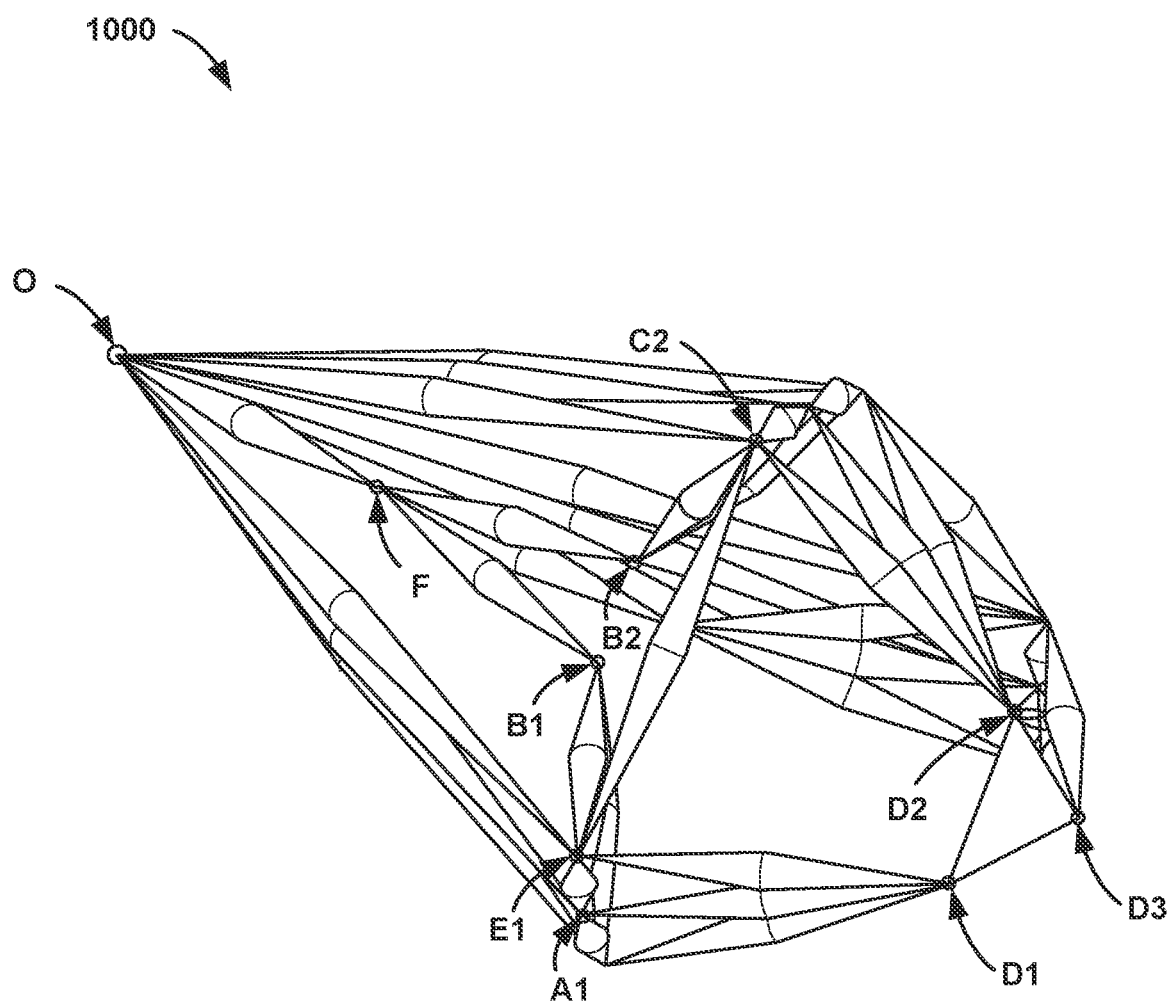
FIG. 37 illustrates another view of the example mechanical linkage device of FIG. 35, according to an example embodiment.
Figure 39:
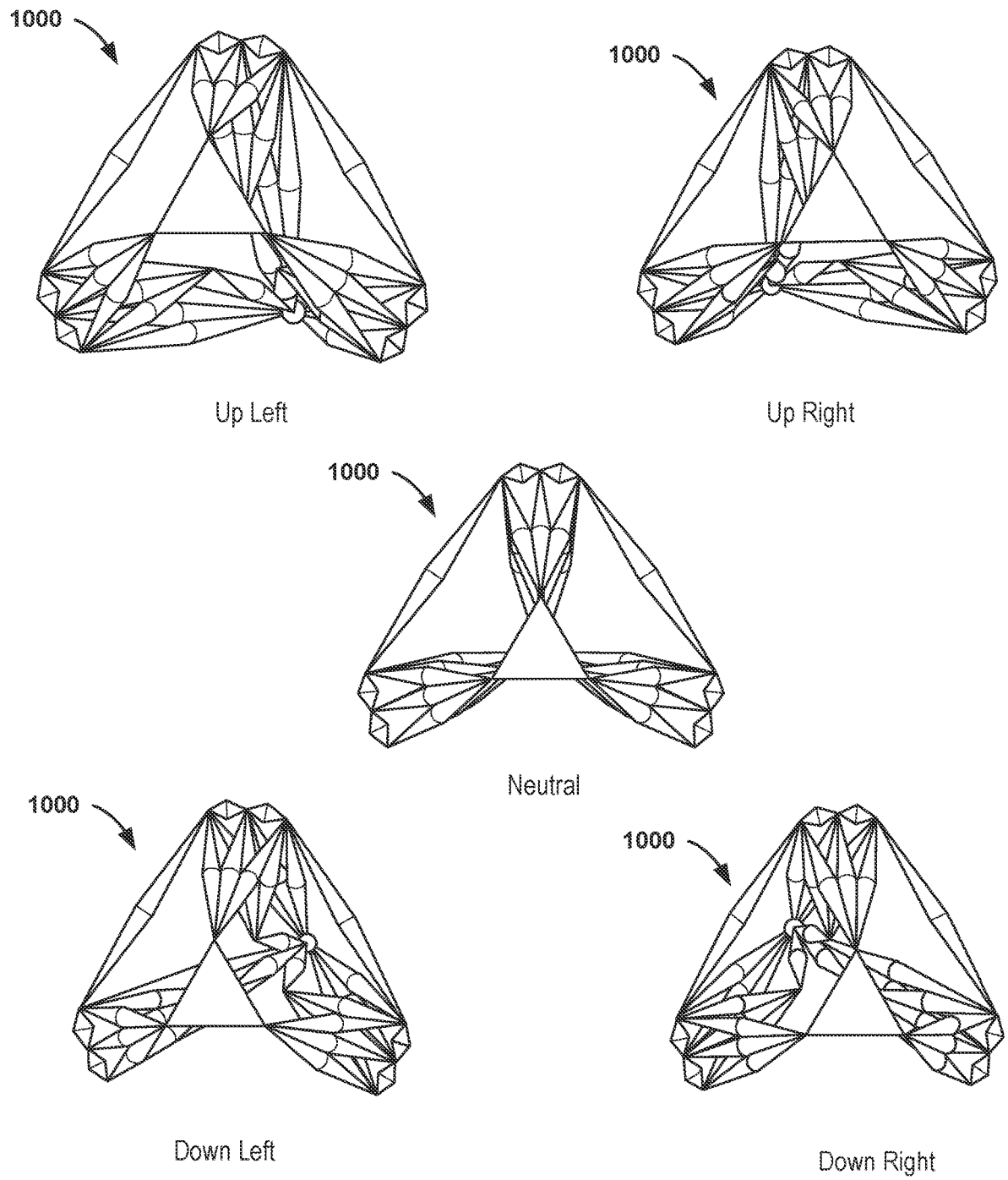
FIG. 39 illustrates various views of the example mechanical linkage device of FIG. 35, according to an example embodiment.
Figure 40:
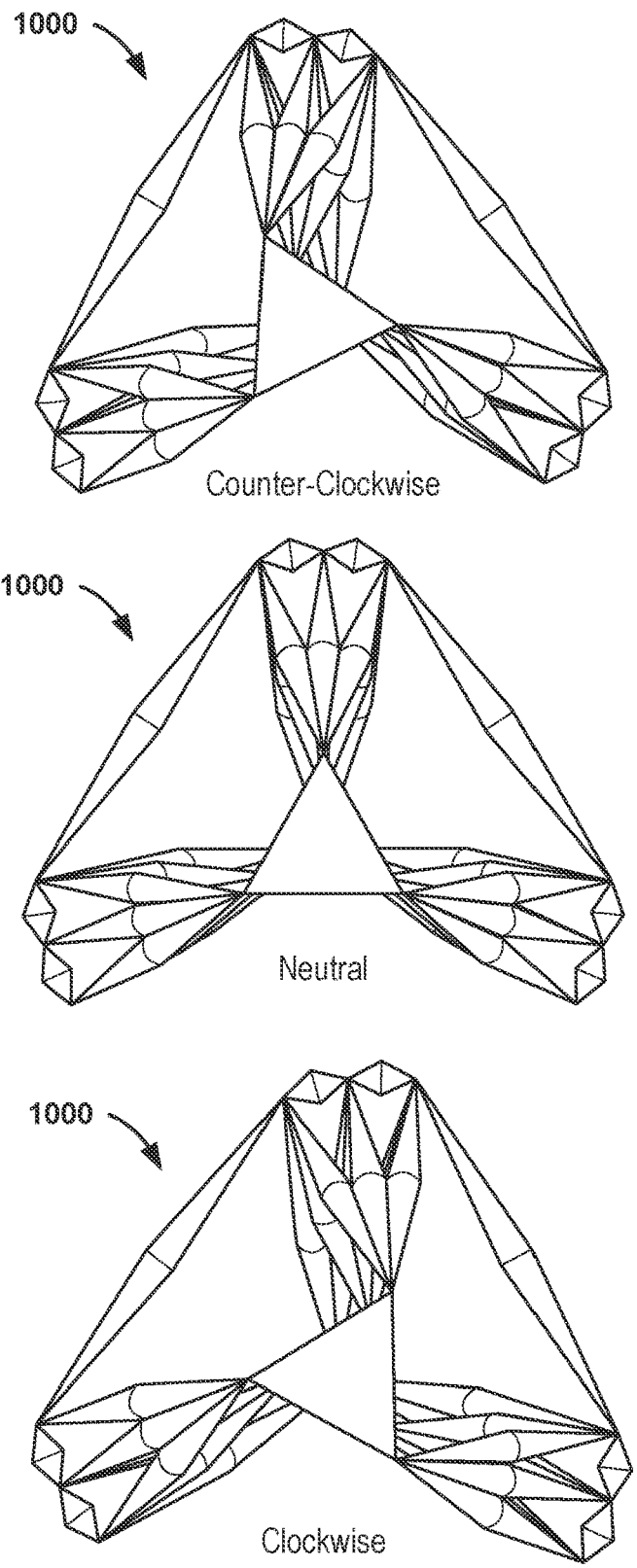
FIG. 40 illustrates various views of the example mechanical linkage device of FIG. 35, according to an example embodiment.

FIG. 36 illustrates the mechanical linkage device 1000 from the front view. FIG. 37 illustrates the mechanical linkage device 1000 from the angle with the points O and F labeled along with points B, C, D, and E for the three mechanical linkage devices 100. FIG. 38 illustrates the mechanical linkage device 1000 in the neutral position along with two moved states. FIG. 39 illustrates a front view of the mechanical linkage device 1000 in the neutral position along with translations in the plane. FIG. 40 illustrates a front view of the mechanical linkage device 1000 in the neutral position along with rotations of the plane section.

It is possible to constrain the mechanical linkage device 1000 even further to eliminate the rotational degree of freedom and leave the rigid body or plane section with only two translational degrees of freedom. One way is for additional constraints between the rigid body and the base link can be attached such as a double parallelogram structure in the movement plane that is connected to the ground link. Another approach is to constrain the movement of any line segment on the surface of the sphere Sf between any of the three or more copies of point B to undergo parallel transport as it translates. This is can be viewed as a longitudinal line remaining a longitudinal as it moves around the sphere. This can be accomplished using spherical linkages or structures which lie in or on the sphere Sf.

If only two mechanical linkage devices 100 are used, a rigid body is not constrained to the plane, but a line can be constrained to be in the plane.

Figure 41:
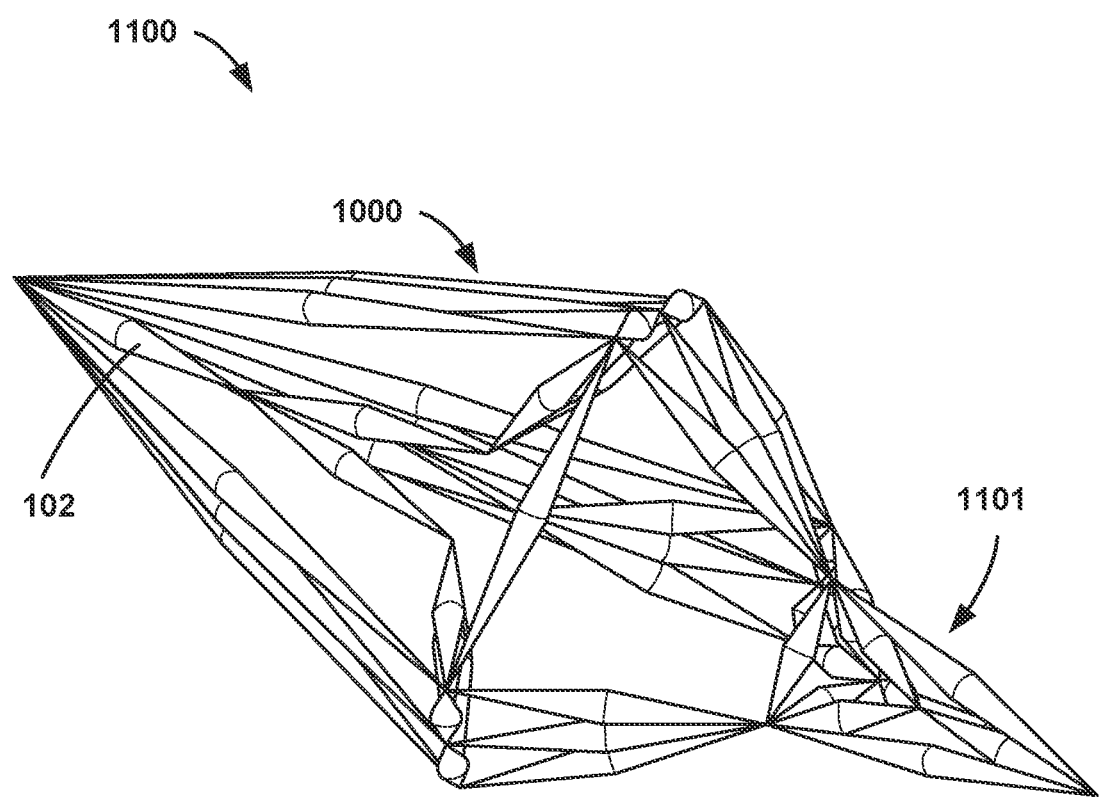
FIG. 41 illustrates another example mechanical linkage device, according to an example embodiment.
Figure 42:
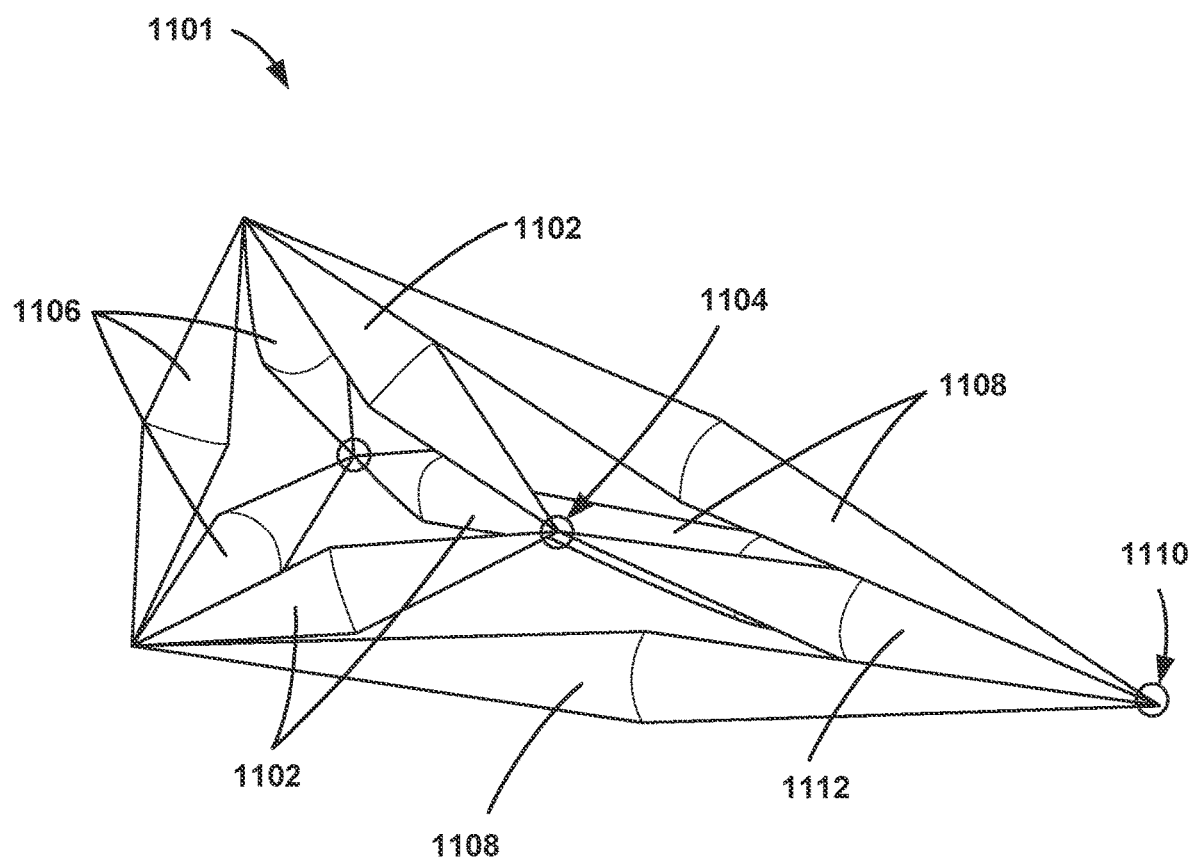
FIG. 42 illustrates a portion of the mechanical linkage device of FIG. 41, according to an example embodiment.

Sometimes it is useful to constrain one line segments movement relative to another to be in a plane normal to one line segment and a fixed distance away. Such an example is shown in the mechanical linkage device 1100 of FIG. 41, which includes a double pyramid 1101 in place of the plane segment or rigid body in any of the mechanical linkage device 1000 plane segments or rigid bodies. The double pyramid constraint consists of links connected with spherical joint constraints. FIG. 42 illustrates one of the double pyramids 1101. As shown in FIG. 42, three short links 1102 connect at a point 1104 and connect to three plane links 1106 that connect the free ends of the short links 1102 and lie in the same plane as each other. Three long links 1108 connect to the plane links 1106 as well and meet at a shared point 1110. The normal link 1112 then connects the long links 1108 and the short links 1102. The result is that the normal link 1112 is normal to the plane the plane links 1106 lie in. When the plane links 1106 are connected to the D points of the mechanical linkage device 1000, the result is a system where the ground link 102 and the normal link 1112 maintain a relationship where they are always parallel to each other and the end of the normal link 1112 remain in planes a fixed distance from the ground link 102.

One alternative is to have two mechanical linkage devices 100 with connected ground links and different movement planes connected with a body between their respective end points. This would place a distance constrain between the end points and force the line between them. If the line is normal to both planes, then the line would also move to be parallel to the ground links.

Figure 45:
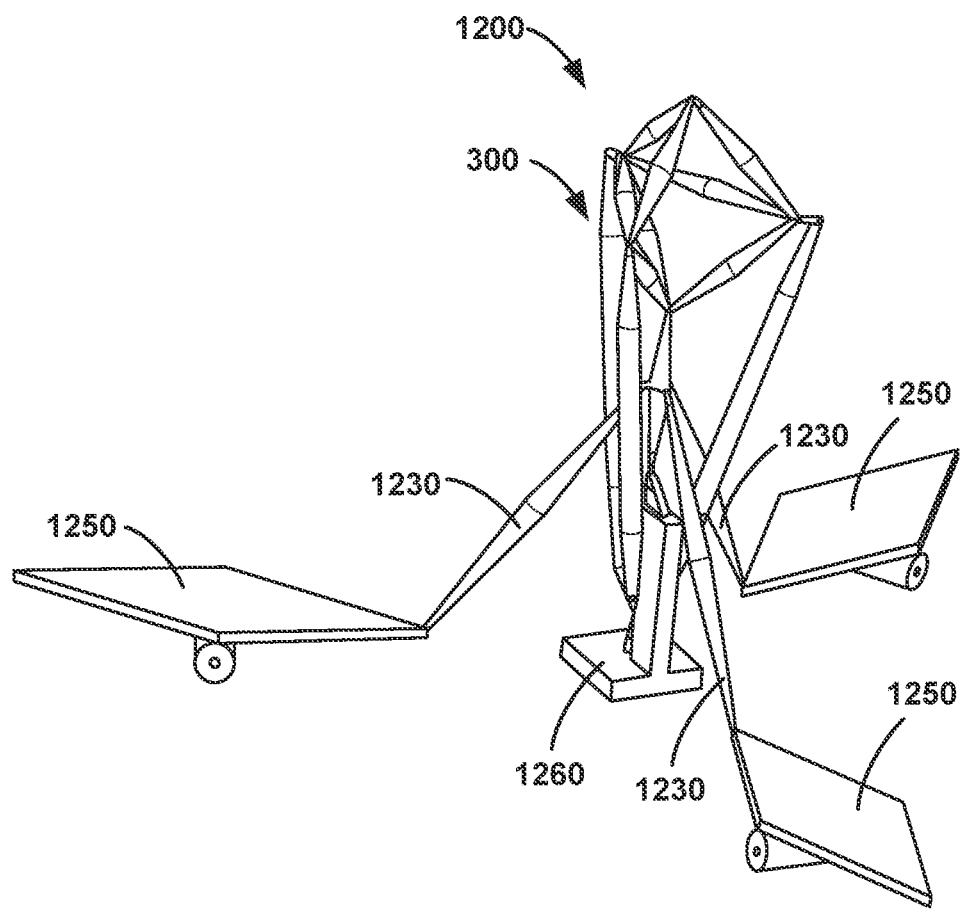
FIG. 45 illustrates another example mechanical linkage device, according to an example embodiment.
Figure 46:
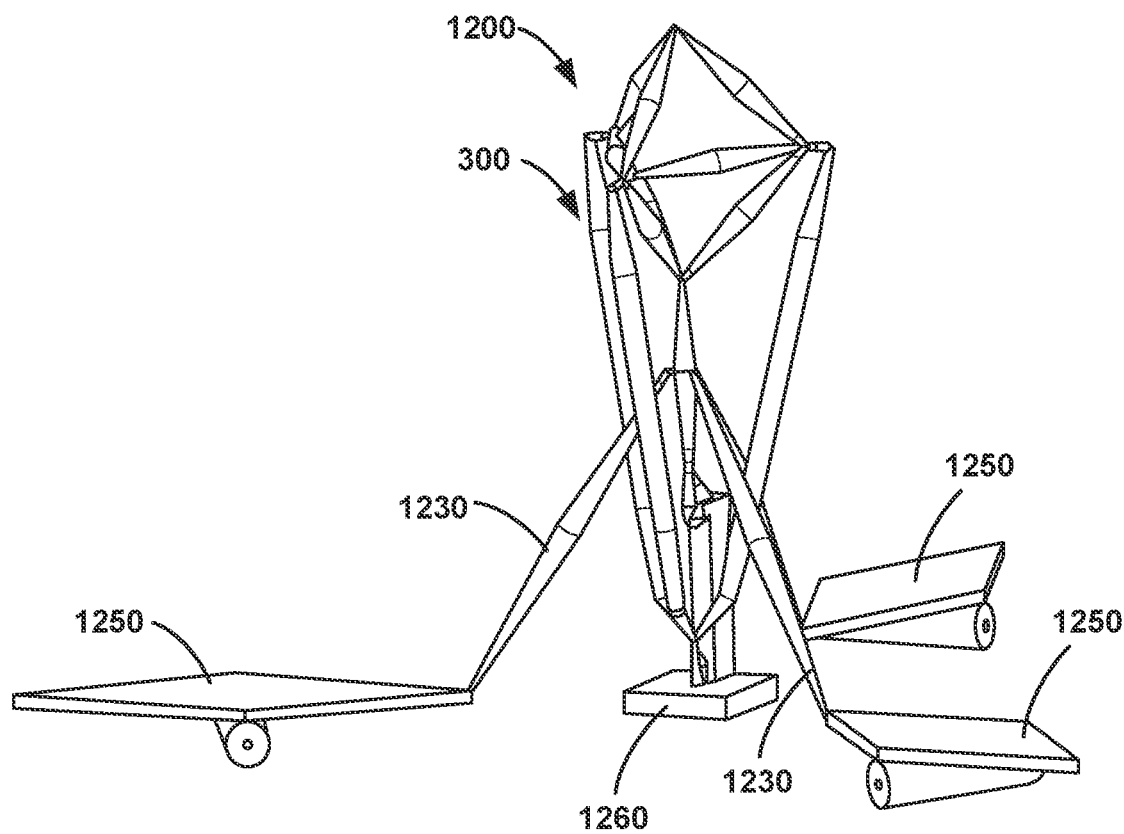
FIG. 46 illustrates another view of the example mechanical linkage device of FIG. 45, according to an example embodiment.

All of the embodiments of the perfect plane mechanism and its straight line variants can be actuated. This actuation can come in the form of additional links between points that have a controlled length or a controlled angle between links. One embodiment of actuation that is useful for microelectromechanical (MEMS) devices, which is shown in the mechanical linkage device 1200 is seen in FIG. 45. MEMS actuators 1250 that rotate are connected vial connector links 1230 to the control link 1204. This allows the rotation of the MEMS actuator 1250 to move the control link 1204 around actuating the perfect plane mechanism. An alternative view can be seen in FIG. 46 where the base link 1260 can be seen to have the same angle reducing structure as the living hinge design in FIG. 43. This design allows for the small angle changes of the MEMS actuator 1250 to turn into planar movement of the end point 1212. The main benefit of this structure is that it allows for the trade off of Z height for XY range rather than XY foot print typically found in a MEMS device.

While all of the embodiments described above can focused on the production of a movement of the end point D in a plane, it is possible to vary the mechanisms to make other structures. By having the control link different in length from the ground link, the center of inversion is moved off of a sphere, centered on F. The result is that the end point D will instead move along a sphere of large radius defined by the size of the two links and whether B and D are on the same side of the sphere centered on F. This is useful when one wishes to machine large radii structures. For the straight line mechanism variants, changing the length of the control link relative to link 106 allows the end point D to move along a circle of controllable radius. Point D is the end point and the point B is the control point. The general category of this device is the 3D inversion mechanism.

Figure 47:
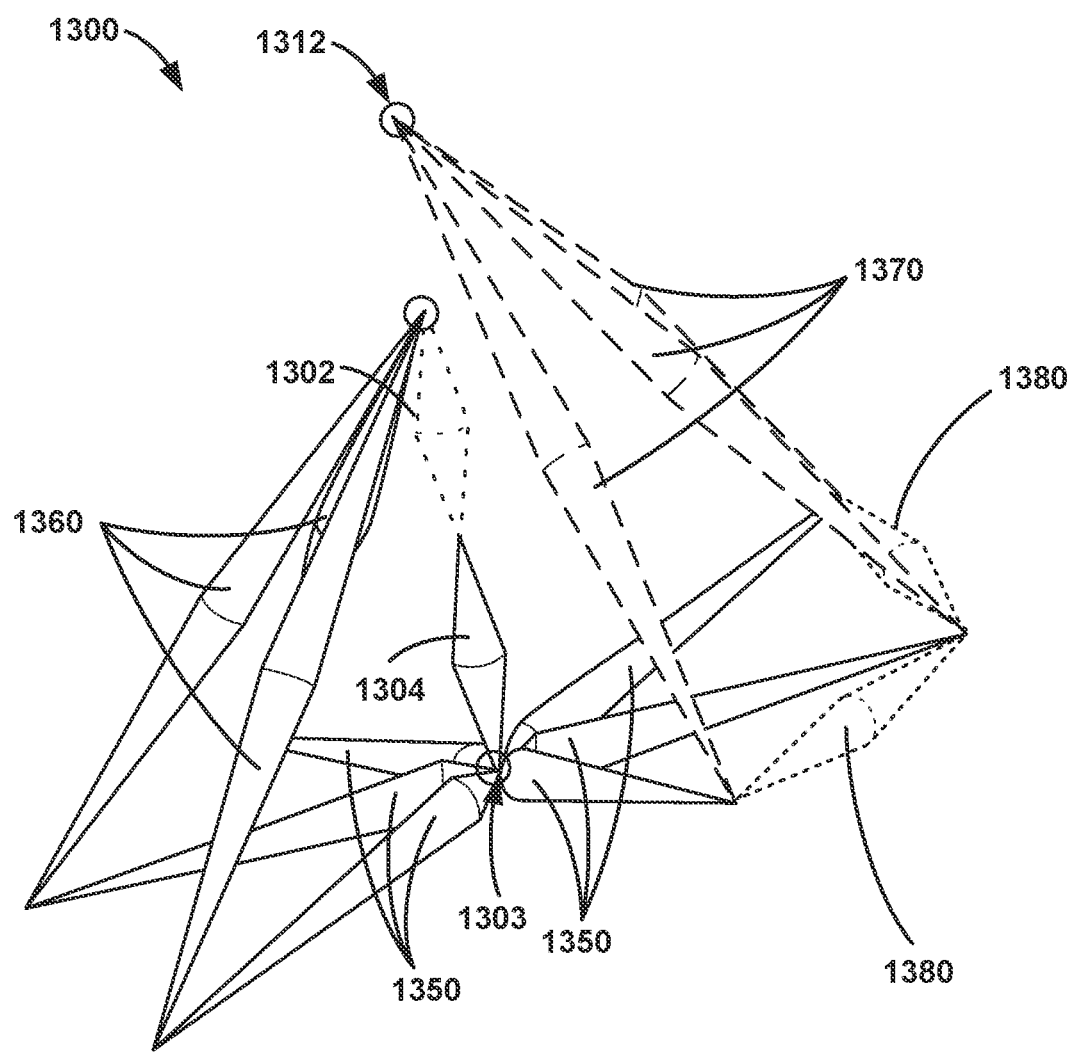
FIG. 47 illustrates another example mechanical linkage device, according to an example embodiment.

FIG. 47 illustrates another mechanical linkage device 1300. In particular, the mechanical linkage device 1300 is an inversion mechanism. The mechanical linkage device 1300 includes a ground link 1302, a control link 1304, and a plurality of linkages having a first end linked to a control point 1303 and a second end being linked to an end point 1312. In the particular example shown in FIG. 47, the mechanical linkage device 1300 includes six linkages 1350 extending from the control link 1304, three linkages 1360 connecting three of the linkages 1350 to the ground link 1302, three linkages 1370 from three of the linkages 1350 to the end point 1312, and two linkages 1380 positioned between the three linkages 1370 and three of the linkages 1350. FIG. 48 illustrates different positions of the mechanical linkage device 1300 showing the end point 1312 constrained to move along a straight line.

Figure 49:
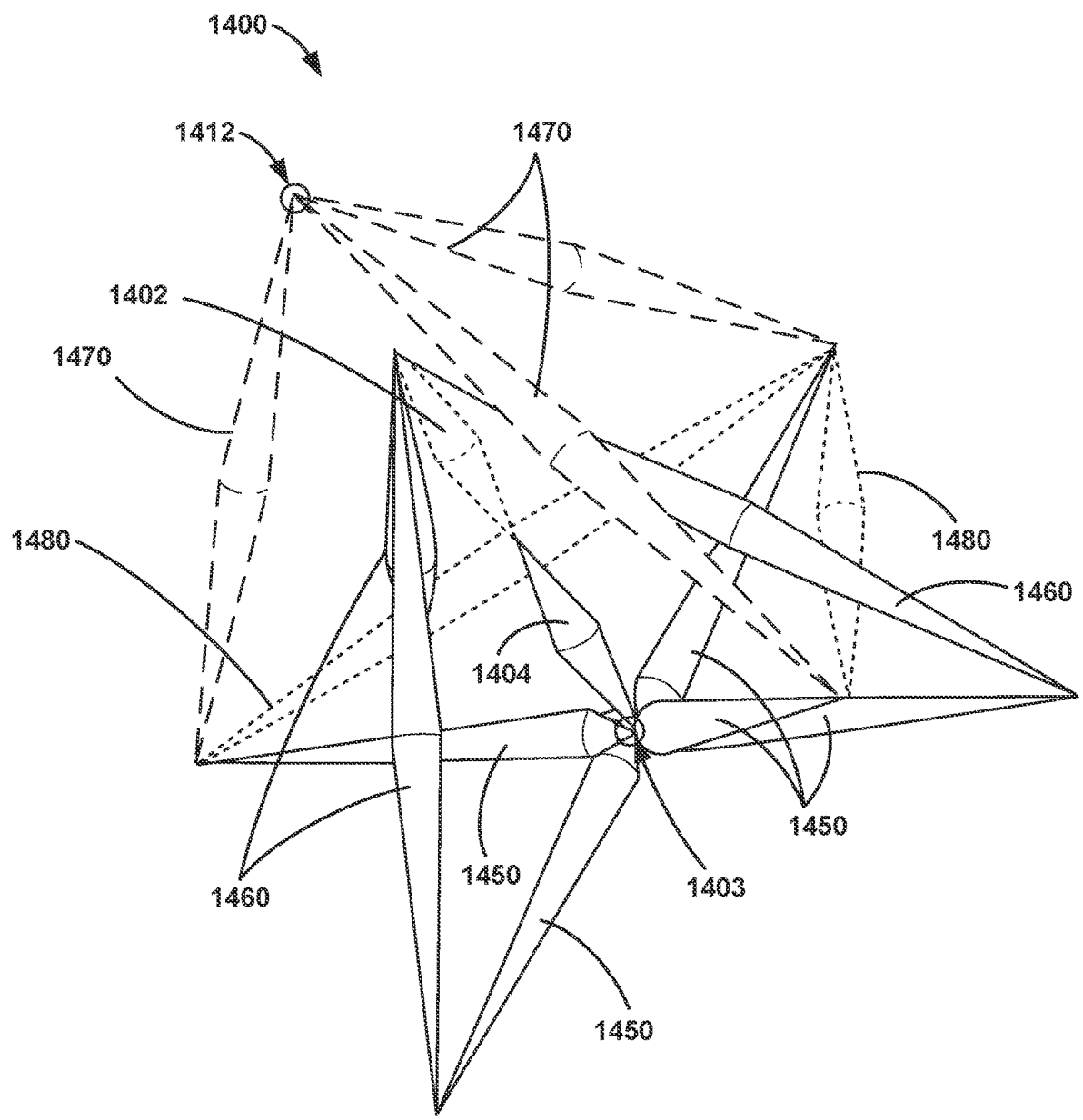
FIG. 49 illustrates another example mechanical linkage device, according to an example embodiment.

FIG. 49 illustrates another mechanical linkage device 1400. In particular, the mechanical linkage device 1400 is another inversion mechanism. The mechanical linkage device 1400 includes a ground link 1402, a control link 1404, and a plurality of linkages having a first end linked to a control point 1403 and a second end being linked to an end point 1412. In the particular example shown in FIG. 49, the mechanical linkage device 1400 includes six linkages 1450 extending from the control link 1404, three linkages 1460 connecting three of the linkages 1450 to the ground link 1402, three linkages 1470 connecting three of the linkages 1450 to the end point 1412, and two linkages 1480 positioned between the three linkages 1470 and three of the linkages 1450.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense. Further, it is intended to be understood that the following clauses (and any combination of the clauses) further describe aspects of the present description.

I claim:

1. A mechanical linkage device comprising:
   a ground link comprising an inverse center linked to one end of the ground link;
   a movement link connecting the ground link to a control point; and
   two or more linkages having a first link of the two or more linkages including a first end linked to the control point and a second link of the two or more linkages including second end linked to an end point, wherein the end point, the control point, and the inverse center of the ground link remain co-linear, wherein the control point and the end point have an inverse relationship such that movement of the control point is inversely translated to the end point, and wherein the ground link, the movement link, and at least one of the two or more linkages do not all lie in a plane throughout an entire range of motion of the mechanical linkage device.

2. The mechanical linkage device of claim 1, wherein movement of the control point on a spheroid generates a plane or a spheroid defined by the end point such that the end point is an inversion of the spheroid defined by the control point.

3. The mechanical linkage device of claim 1, wherein the distance between the one end of the ground link and the other end of the ground link is the same as the distance between the other end of the ground link and the control point, constraining the end point to move in a plane normal to the ground link.

4. The mechanical linkage device of claim 3, wherein the control point is constrained to a circular planar area.

5. The mechanical linkage device of claim 4, wherein the constraint is enforced by a joint between the ground link and the control point with an adjustable angle to change the plane of movement.

6. The mechanical linkage device of claim 4, wherein a living hinge provides constraint enforced in a joint between the ground link and the control point.

7. The mechanical linkage device of claim 4, wherein a rotary joint provides constraint enforced in a joint between the ground link and the control point.

8. The mechanical linkage device of claim 4, wherein the constraint is enforced by a joint at the control point and the far end of the ground link opposite the end of the ground link with the inverse center.

9. The mechanical linkage device of claim 1, wherein distances and angles one or more of the ground link, the movement link, and the two or more linkages are controlled by one or more actuators to control a position of the control point.

10. The mechanical linkage device of claim 9, wherein the actuation is provided through linkages to multiple actuators acting on a link connecting the ground link to the control point.

11. The mechanical linkage device of claim 1, wherein the end point and the control point are on the same side of the ground link.

12. The mechanical linkage device of claim 1, wherein the end point and the control point are on opposite sides of the ground link.

13. The mechanical linkage device of claim 1, wherein one or more of the ground link, the movement link, and the two or more linkages have spherical joint connections to each other.

14. The mechanical linkage device of claim 13, wherein a spherical joint connection is positioned at a first ground link at the inverse center, at a second end of the ground link, and at a first end of the control link at the control point.

15. The mechanical linkage device of claim 1, wherein one or more of the ground link, the movement link, and the two or more linkages have living hinge joint connections to each other.

16. The mechanical linkage device of claim 1, wherein the device is composed of links that are connected with spherical joints and rotary joints, and one assembly of joints positioned between the control point and the end point form a compound joint that emulate the function of multiple spherical joints and links.

17. The mechanical linkage device of claim 1, wherein one or more links that are substantially in a plane are connected by rotary pin joints, and wherein one or more links that are not in the plane are connected by spherical joints.

18. A mechanical linkage device for constraining the movement of a rigid body into a plane comprising three or more mechanical linkage devices of claim 1 with connected ground links connected to the rigid body.

19. The mechanical linkage device of claim 18, wherein additional constraints between the ground link and the rigid body constrain the rigid body to move by translation and without rotation.

20. The mechanical linkage device of claim 18, wherein additional linkages between the ground link and the control points force a line on the surface of a sphere described by the movements of the control points to undergo parallel transport on the sphere.

* * * * *